(12) United States Patent
Lee et al.

(10) Patent No.: US 7,426,010 B2
(45) Date of Patent: Sep. 16, 2008

(54) METHOD FOR FABRICATING LCD

(75) Inventors: Sang Seok Lee, Taegu-kwangyokshi (KR); Sang Ho Park, Pusan-kwangyokshi (KR)

(73) Assignee: LG Display Co., Ltd., Seoul (KR)

( * ) Notice: Subject to any disclaimer, the term of this patent is extended or adjusted under 35 U.S.C. 154(b) by 771 days.

(21) Appl. No.: 10/289,380

(22) Filed: Nov. 7, 2002

(65) Prior Publication Data

US 2003/0160935 A1 Aug. 28, 2003

(30) Foreign Application Priority Data

Feb. 27, 2002 (KR) .............. P 2002-10553

(51) Int. Cl.
*G02F 1/1339* (2006.01)
*G02F 1/13* (2006.01)

(52) U.S. Cl. .................... 349/190; 349/153

(58) Field of Classification Search ........... 349/187, 349/189, 190, 153
See application file for complete search history.

(56) References Cited

U.S. PATENT DOCUMENTS

| | | |
|---|---|---|
| 3,978,580 A | 9/1976 | Leupp et al. |
| 4,094,058 A | 6/1978 | Yasutake et al. |
| 4,653,864 A | 3/1987 | Baron et al. |
| 4,691,995 A | 9/1987 | Yamazaki |
| 4,775,225 A | 10/1988 | Tsuboyama et al. |
| 5,247,377 A | 9/1993 | Omeis |
| 5,263,888 A * | 11/1993 | Ishihara et al. ............ 445/25 |
| 5,379,139 A | 1/1995 | Sato et al. |
| 5,406,989 A | 4/1995 | Abe |
| 5,410,423 A | 4/1995 | Furushima et al. |
| 5,499,128 A | 3/1996 | Hasegawa et al. |
| 5,507,323 A | 4/1996 | Abe |
| 5,511,591 A | 4/1996 | Abe |
| 5,539,545 A | 7/1996 | Shimizu et al. |
| 5,548,429 A | 8/1996 | Tsujita |
| 5,642,214 A | 6/1997 | Ishii |
| 5,680,189 A | 10/1997 | Shimizu et al. |
| 5,742,370 A | 4/1998 | Kim |
| 5,757,451 A | 5/1998 | Miyazaki et al. |
| 5,852,484 A | 12/1998 | Inoue et al. |
| 5,854,664 A | 12/1998 | Inoue et al. |
| 5,861,932 A | 1/1999 | Inata et al. |
| 5,875,922 A | 3/1999 | Chastine |
| 5,952,676 A | 9/1999 | Sato |
| 5,952,678 A | 9/1999 | Ashida |
| 5,956,112 A | 9/1999 | Fujimori et al. |
| 6,001,203 A | 12/1999 | Yamada et al. |

(Continued)

FOREIGN PATENT DOCUMENTS

EP  1003066 A1  5/2000

(Continued)

*Primary Examiner*—David Nelms
*Assistant Examiner*—David Y. Chung
(74) *Attorney, Agent, or Firm*—McKenna, Long & Aldridge LLP

(57) ABSTRACT

A method of fabricating a liquid crystal display using a liquid crystal applying method includes loading a first substrate and a second substrate having seals formed thereon into a bonding chamber, aligning the first and second substrates, bonding the first and second substrates, fixing the bonded two substrates, and unloading the fixed first and second substrates.

21 Claims, 16 Drawing Sheets

U.S. PATENT DOCUMENTS

| | | | |
|---|---|---|---|
| 6,011,609 A | 1/2000 | Kato | |
| 6,016,178 A | 1/2000 | Kataoka | |
| 6,016,181 A | 1/2000 | Shimada | |
| 6,055,035 A | 4/2000 | Von Gutfeld | |
| 6,122,033 A * | 9/2000 | Mathew et al. | 349/155 |
| 6,163,357 A | 12/2000 | Nakamura | |
| 6,211,938 B1 * | 4/2001 | Mori | 349/190 |
| 6,219,126 B1 | 4/2001 | von Gutfeld | |
| 6,222,603 B1 * | 4/2001 | Sakai et al. | 349/153 |
| 6,226,067 B1 | 5/2001 | Nishiguchi | |
| 6,236,445 B1 | 5/2001 | Foschaar et al. | |
| 6,304,306 B1 | 10/2001 | Shiomi | |
| 6,304,311 B1 * | 10/2001 | Egami et al. | 349/189 |
| 6,337,730 B1 | 1/2002 | Ozaki et al. | |
| 6,414,733 B1 | 7/2002 | Ishikawa | |
| 6,487,461 B1 * | 11/2002 | Gaynes et al. | 700/58 |
| 6,552,772 B2 * | 4/2003 | Egami | 349/187 |
| 6,650,392 B2 * | 11/2003 | Iwanaga et al. | 349/153 |
| 6,665,043 B1 * | 12/2003 | Okuyama et al. | 349/187 |
| 2001/0004281 A1 * | 6/2001 | Sasaki | 349/190 |

FOREIGN PATENT DOCUMENTS

| | | |
|---|---|---|
| JP | 51065656 | 6/1976 |
| JP | 57038414 | 3/1982 |
| JP | 57088428 | 6/1982 |
| JP | 58027126 | 2/1983 |
| JP | 59057221 | 4/1984 |
| JP | 59195222 | 11/1984 |
| JP | 60111221 | 6/1985 |
| JP | 60164723 | 8/1985 |
| JP | 60217343 | 10/1985 |
| JP | 61007822 | 1/1986 |
| JP | 61055625 | 3/1986 |
| JP | S62-054225 | 3/1987 |
| JP | S62-054228 | 3/1987 |
| JP | S62-054229 | 3/1987 |
| JP | 62089025 | 4/1987 |
| JP | 62090622 | 4/1987 |
| JP | 62205319 | 9/1987 |
| JP | 63109413 | 5/1988 |
| JP | 63110425 | 5/1988 |
| JP | 63128315 | 5/1988 |
| JP | 63311233 | 12/1988 |
| JP | H03-009549 | 1/1991 |
| JP | H05-036425 | 2/1993 |
| JP | H05-036426 | 2/1993 |
| JP | H05-107533 | 4/1993 |
| JP | 05127179 | 5/1993 |
| JP | 5154923 | 6/1993 |
| JP | 05265011 | 10/1993 |
| JP | 05281557 | 10/1993 |
| JP | 05281562 | 10/1993 |
| JP | H06-018829 | 1/1994 |
| JP | 06051256 | 2/1994 |
| JP | H06-064229 | 3/1994 |
| JP | 06148657 | 5/1994 |
| JP | 6160871 | 6/1994 |
| JP | H06-194637 | 7/1994 |
| JP | 6235925 | 8/1994 |
| JP | 06265915 | 9/1994 |
| JP | 6313870 | 11/1994 |
| JP | 7084268 | 3/1995 |
| JP | 07128674 | 5/1995 |
| JP | 07181507 | 7/1995 |
| JP | H07-275770 | 10/1995 |
| JP | H07-275771 | 10/1995 |
| JP | H08-076133 | 3/1996 |
| JP | 08095066 | 4/1996 |
| JP | 8101395 | 4/1996 |
| JP | 08106101 | 4/1996 |
| JP | H08-110504 | 4/1996 |
| JP | H08-136937 | 5/1996 |
| JP | 08171094 | 7/1996 |
| JP | 08190099 | 7/1996 |
| JP | H08-173874 | 7/1996 |
| JP | 08240807 | 9/1996 |
| JP | 09005762 | 1/1997 |
| JP | 09026578 | 1/1997 |
| JP | H09-001026 | 1/1997 |
| JP | 9061829 | 3/1997 |
| JP | 09073075 | 3/1997 |
| JP | 09073096 | 3/1997 |
| JP | H09-094500 | 4/1997 |
| JP | 09127528 | 5/1997 |
| JP | 09230357 | 9/1997 |
| JP | 09281511 | 10/1997 |
| JP | 09311340 | 12/1997 |
| JP | 10123537 | 5/1998 |
| JP | 10123538 | 5/1998 |
| JP | 10142616 | 5/1998 |
| JP | 10177178 | 6/1998 |
| JP | H10-174924 | 6/1998 |
| JP | 10221700 | 8/1998 |
| JP | 10282512 | 10/1998 |
| JP | 10-333159 | 12/1998 |
| JP | 10333157 | 12/1998 |
| JP | 10333159 | 12/1998 |
| JP | 11014953 | 1/1999 |
| JP | 11038424 | 2/1999 |
| JP | 11064811 | 3/1999 |
| JP | 11109388 | 4/1999 |
| JP | 11133438 | 5/1999 |
| JP | 11142864 | 5/1999 |
| JP | 11174477 | 7/1999 |
| JP | 11212045 | 8/1999 |
| JP | 11248930 | 9/1999 |
| JP | H11-262712 | 9/1999 |
| JP | H11-264991 | 9/1999 |
| JP | 11326922 | 11/1999 |
| JP | 11344714 | 12/1999 |
| JP | 2000-002879 | 1/2000 |
| JP | 2000029035 | 1/2000 |
| JP | 2000-056311 | 2/2000 |
| JP | 2000-066165 | 3/2000 |
| JP | 2000-066218 | 3/2000 |
| JP | 2000-093866 | 4/2000 |
| JP | 2000-137235 | 5/2000 |
| JP | 3000-147528 | 5/2000 |
| JP | 2000-193988 | 7/2000 |
| JP | 2000-241824 | 9/2000 |
| JP | 2000-284295 | 10/2000 |
| JP | 2000-292799 | 10/2000 |
| JP | 2000-310759 | 11/2000 |
| JP | 2000-310784 | 11/2000 |
| JP | 2000-338501 | 12/2000 |
| JP | 2001-005401 | 1/2001 |
| JP | 2001-005405 | 1/2001 |
| JP | 2001-013506 | 1/2001 |
| JP | 2001-033793 | 2/2001 |
| JP | 2001-042341 | 2/2001 |
| JP | 2001-051284 | 2/2001 |
| JP | 2001-066614 | 3/2001 |
| JP | 2001-066615 | 3/2001 |
| JP | 2001-091727 | 4/2001 |
| JP | 2001-117109 | 4/2001 |
| JP | 2001117105 | 4/2001 |
| JP | 2001-133745 | 5/2001 |
| JP | 2001-133799 | 5/2001 |
| JP | 2001133794 | 5/2001 |
| JP | 2001142074 | 5/2001 |
| JP | 2001147437 | 5/2001 |
| JP | 2001-166272 | 6/2001 |
| JP | 2001-166310 | 6/2001 |

| | | | | | |
|---|---|---|---|---|---|
| JP | 2001-174829 | 6/2001 | JP | 2002-156518 | 5/2002 |
| JP | 2001154211 | 6/2001 | JP | 2002-169166 | 6/2002 |
| JP | 2001-183683 | 7/2001 | JP | 2002-169167 | 6/2002 |
| JP | 2001-209052 | 8/2001 | JP | 2002-182222 | 6/2002 |
| JP | 2001-209056 | 8/2001 | JP | 200208321 | 6/2002 |
| JP | 2001-209057 | 8/2001 | JP | 2002202512 | 7/2002 |
| JP | 2001-209058 | 8/2001 | JP | 2002202514 | 7/2002 |
| JP | 2001-209060 | 8/2001 | JP | 2002214626 | 7/2002 |
| JP | 2001-222017 | 8/2001 | JP | 2002-229042 | 8/2002 |
| JP | 2001-235758 | 8/2001 | JP | 2002-236276 | 8/2002 |
| JP | 2001-215459 | 9/2001 | JP | 2002-258299 | 8/2002 |
| JP | 2001255542 | 9/2001 | JP | 2002-236292 | 9/2002 |
| JP | 2001264782 | 9/2001 | JP | 2002-277865 | 9/2002 |
| JP | 2001-201750 | 10/2001 | JP | 2002-277866 | 9/2002 |
| JP | 2001-272640 | 10/2001 | JP | 2002-277881 | 9/2002 |
| JP | 2001-281675 | 10/2001 | JP | 2002-287156 | 10/2002 |
| JP | 2001-281678 | 10/2001 | JP | 2002-296605 | 10/2002 |
| JP | 2001-282126 | 10/2001 | JP | 2002-311438 | 10/2002 |
| JP | 2001-305563 | 10/2001 | JP | 2002-311440 | 10/2002 |
| JP | 2001-330837 | 11/2001 | JP | 2002-311442 | 10/2002 |
| JP | 2001330840 | 11/2001 | JP | 2002-323687 | 11/2002 |
| JP | 2001-356353 | 12/2001 | JP | 2002-323694 | 11/2002 |
| JP | 2002-337335 | 12/2001 | JP | 2002-333628 | 11/2002 |
| JP | 2001356354 | 12/2001 | JP | 2002-333635 | 11/2002 |
| JP | 2002014360 | 1/2002 | JP | 2002-333843 | 11/2002 |
| JP | 2002023176 | 1/2002 | JP | 2002-341329 | 11/2002 |
| JP | 2002049045 | 2/2002 | JP | 2002-341355 | 11/2002 |
| JP | 2002-079160 | 3/2002 | JP | 2002-341356 | 11/2002 |
| JP | 2002-080321 | 3/2002 | JP | 2002-341357 | 11/2002 |
| JP | 2002082340 | 3/2002 | JP | 2002-341358 | 11/2002 |
| JP | 2002090759 | 3/2002 | JP | 2002-341359 | 11/2002 |
| JP | 2002090760 | 3/2002 | JP | 2002-341362 | 11/2002 |
| JP | 2002-122870 | 4/2002 | KR | 100156422 B1 | 7/1998 |
| JP | 2002107740 | 4/2002 | KR | 2000-0035302 A1 | 6/2000 |
| JP | 2002122872 | 4/2002 | KR | 1020020015004 A | 2/2002 |
| JP | 2002122873 | 4/2002 | | | |
| JP | 2002-131762 | 5/2002 | | | |

* cited by examiner (a)  (b)  (c)

(a)  (b)  (c)

METHOD FOR FABRICATING LCD

This application claims the benefit of Korean Patent Application No. P2002-0010553 filed on Feb. 27, 2002, which is hereby incorporated by reference for all purposes as if fully set forth herein.

This application incorporates by reference two co-pending applications, Ser. No. 10/184,096, filed on Jun. 28, 2002, entitled "SYSTEM AND METHOD FOR MANUFACTURING LIQUID CRYSTAL DISPLAY DEVICES" and Ser. No. 10/184,088, filed on Jun. 28, 2002, entitled "SYSTEM FOR FABRICATING LIQUID CRYSTAL DISPLAY AND METHOD OF FABRICATING LIQUID CRYSTAL DISPLAY USING THE SAME", as if fully set forth herein.

BACKGROUND OF THE INVENTION

1. Field of the Invention

The present invention relates to a liquid crystal display, and more particularly, to a method for fabricating an LCD having a liquid crystal dropping method applied thereto.

2. Discussion of the Related Art

Keeping pace with development of an information oriented society, demands on displays increase gradually in a variety of forms. Recently, to meet the demands, different flat display panels, such as LCD (Liquid Crystal Display), PDP (Plasma Display Panel), ELD (Electro Luminescent Display), VFD (Vacuum Fluorescent Display), and the like, have been under development, and some of which have been employed as displays in various apparatuses.

Although LCDs have been used most widely as mobile displays, the LCDs are replacing CRTs (Cathode Ray Tube) due to features and advantages of excellent picture quality, lightweight and thin design, and low power consumption. Besides mobile or portable displays, such as a monitor of a notebook computer, the LCDs are under development for TVs for receiving and displaying broadcasting signals, and monitors for computers.

Despite the various technical developments in the LCD technology in multiple fields, efforts for enhancing picture quality of the LCD as a display are inconsistent with the features and advantages of the LCD in some aspects. Therefore, for the LCD being employed in various fields as a general display, a key for development of the LCD lies on how much the LCD is needed to implement a high quality picture, such as high definition and high luminance, and a large sized screen, while still maintaining the beneficial features such as light weight and thin design and low power consumption.

The LCD is provided with a liquid crystal panel for displaying picture, and a driving part for providing a driving signal to the liquid crystal panel. The liquid crystal panel has first and second glass substrates bonded with a gap between the substrates, and liquid crystal injected between the first and second glass substrates.

The first glass substrate (a TFT array substrate), includes a plurality of gatelines arranged in one direction at fixed intervals, a plurality of datalines arranged in a direction perpendicular to the gatelines at fixed intervals, a plurality of pixel electrodes in respective pixel regions defined at crossed points of the gatelines and the datalines to form a matrix, and a plurality of thin film transistors switchable in response to a signal from the gatelines for transmission of a signal from the dataline to the pixel electrodes.

The second glass substrate (a color filter substrate) has a black matrix layer for shielding light from areas excluding the pixel regions, a (RGB) color filter layer for displaying colors, and a common electrode.

The foregoing first and second substrates are spaced apart by spacers, and bonded by a sealant having a liquid crystal injection opening, through which liquid crystal is injected.

The liquid crystal is injected by evacuating the space between the bonded two substrates and dipping the liquid crystal injection opening in a liquid crystal bath. The liquid crystal flows into the space between the two substrates by a capillary tube phenomenon. Once the liquid crystal is injected, the liquid crystal injection opening is sealed by a sealant.

However, the related art method for fabricating an LCD having liquid crystal injected therein has the following problems. First, the related art method has poor productivity because the dipping of the liquid crystal injection opening in a liquid crystal bath while the space between the two substrates are maintained at a vacuum takes much time. Second, the liquid crystal injection, particularly into a large sized LCD, can result in an imperfect filling of the liquid crystal in the panel, which is a cause of a defective panel. Third, the complicated and long fabrication of the liquid crystal injection process requires the use of many liquid crystal injection devices, which occupies much space.

Accordingly, a method of fabricating an LCD by using a liquid crystal applying method has been under research recently. A Japanese laid-open patent publication No. 2000-147528 discloses the following liquid crystal applying method.

A related art method for fabricating an LCD having the foregoing liquid crystal applying method will be explained with reference to FIGS. 1A–1F. Referring to FIG. 1A, UV sealant 1 is coated on a first glass substrate 3 having a thin film transistor array formed thereon to a thickness of approx. 30 μm, and liquid crystal 2 is applied on an inner side of the sealant 1 (a thin film transistor array part). No liquid crystal injection opening is provided in the sealant 3.

The first glass substrate 3 is mounted on a table 4 in a vacuum chamber 'C' which is movable in a horizontal direction. The entire bottom surface of the first glass substrate 3 is held by a first substrate holder 5 using vacuum.

Referring to FIG. 1B, an entire bottom surface of the second glass substrate 6 having the color filter array is held by vacuum at a second holder 7. The vacuum chamber 'C' is then closed and evacuated. The second holder 7 is moved down in a vertical direction until a gap between the first and second glass substrates 3 and 6 is 1 mm, and the table 4 with the first glass substrate 3 thereon is moved in a horizontal direction to pre-align the first and second glass substrates 3 and 6.

Referring to FIG. 1C, the second holder 7 continues to move down until the second glass substrate 6 comes into contact with the liquid crystal 2 or the sealant 1 on the first substrate 3.

Referring to FIG. 1D, the table 4 with the first glass substrate 3 thereon is moved in a horizontal direction to further align the first and second glass substrates 3 and 6.

Referring to FIG. 1E, the second holder 7 continue to move down until the second glass substrate 6 comes into contact with the sealant 1, if not already, and is pressed down until the gap between the second glass substrate 6 and the first glass substrate 3 becomes 5 μm.

Referring to FIG. 1F, the pre-bonded first and second glass substrates 3 and 6 are taken out of the vacuum chamber 'C', and a UV light 8 is directed to the sealant to set the sealant 1, thereby finishing the fabrication of the LCD panel.

However, the foregoing related art method for fabricating an LCD having the liquid crystal applying method has the following problems.

First, the sealant and liquid crystal are respectively coated and applied on the same substrate which takes more fabrication time before the two substrates are bonded.

Second, during the time needed for coating the sealant and applying the liquid crystal on the first substrate, no progress is made for the second substrate (i.e., the second substrate is idle while the first substrate is being processed), causing an unbalanced fabrication process between the first and second substrates, resulting in an inefficient operation of the production line.

Third, because the sealant and the liquid crystal are both placed on the first substrate, the first substrate with the coat of the sealant applied thereto cannot be subjected to cleaning by an ultrasonic cleaner (USC) because the sealant that is to bond the two substrates may also be cleaned away. Thus, unwanted particles remaining on the substrate cannot be removed, which may interfere with a proper contact of the sealant during bonding.

Fourth, since the two substrates are aligned as the liquid crystal or the sealant on the first substrate comes into contact with the second substrate, the orientation film on the second substrate may be damaged, subsequently resulting in a poor picture quality. Moreover, if the upper and lower tables or stages are not leveled, the first and second substrates may partially or unevenly come into contact with each other. This can scratch the patterns on the substrates and/or result in an uneven seal.

Fifth, the substrate alignment occurs twice by varying only the distance between the two substrates. This limits the accuracy of the alignment of the two substrates.

Sixth, as the substrates become larger, misalignment of the substrates are more likely to be caused during transfer of the substrates such as during substrate unloading or during a subsequent process after the substrates are bonded.

Seventh, as the substrates become larger, maintaining the pre-bonded state of the substrate until the sealant is set in a subsequent process becomes more difficult.

Eighth, the misalignment of the substrates may cause defective orientation of the liquid crystal due to liquid crystal flow between the substrates.

Ninth, the misalignment of the substrates may cause poor aperture ratio.

Eighth, a defective orientation of the liquid crystal may cause blots, such as from scratches, and blots related to luminance.

SUMMARY OF THE INVENTION

Accordingly, the present invention is directed to a method of fabricating a liquid crystal display that substantially obviates one or more of the problems due to limitations and disadvantages of the related art.

An advantage of the present invention is to provide a method of fabricating an LCD having the liquid crystal applying method that can shorten the fabrication time and improve productivity.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the method of fabricating a liquid crystal display (LCD) includes loading a first substrate and a second substrate having seals formed thereon into a bonding chamber, aligning the first and second substrates, bonding the first and second substrates, fixing the bonded two substrates, and unloading the fixed first and second substrates.

Preferably, loading the first and second substrates includes having the first and second substrates held by an upper stage and a lower stage in the bonding chamber, respectively, aligning the first and second substrates initially, placing a substrate receiver in the bonding chamber below the second substrate held by the upper stage, and evacuating the bonding chamber. When the bonding chamber is evacuated, the stages hold onto the first and second substrates by an electrostatic chuck (ESC), respectively.

Aligning the first and second substrates may include first aligning rough marks. Aligning the first and second substrates may include aligning rough marks and fine marks in succession by moving the lower stage. The alignment of the rough marks and the fine marks may be made by employing separate cameras.

The alignment of the rough marks and the fine marks may be made using a camera focusing on a central part between the first glass substrate and the second glass substrate. The alignment of the rough marks and the fine marks may be made using a camera alternately focusing on marks on the first glass substrate and marks on the second glass substrate.

Bonding the first and second substrates preferably includes varying the pressure applied to the upper and lower stages in at least two stages.

The seals may include main seals and fixing seals, and fixing the bonded two substrates includes directing light (UV beam) or applying heat or pressure to the seals. Preferably, the fixing seals are formed at a periphery of the substrate. The fixing seals are preferably formed at parts of the substrate between the panels that will be cut, and at the periphery of the substrate.

The seals may include a plurality of main seals for sealing liquid crystal applied on each panel, a dummy seal for protecting the main seals, and fixing seals for fixing the bonded two substrates. Fixing the bonded two substrates includes directing light (e.g., UV beam), or applying heat or pressure to the fixing seals for fixing the bonded two substrates.

The seals may include a plurality of main seals for sealing the liquid crystal applied on the plurality of panels, and a plurality of dummy seals for protecting the plurality of main seals, respectively.

Fixing the bonded two substrates preferably includes heating at 50–200° C., and directing light of 50–500 mW.

In another aspect of the present invention, there is provided a method of fabricating an LCD including loading a first substrate having liquid crystal and main seals thereon, and a second substrate having fixing seals formed thereon into a bonding chamber, bonding the first and second substrates, setting the fixing seals to fix the first and second substrates, and unloading the fixed first and second substrates.

In a further aspect of the present invention, there is provided a method for fabricating an LCD including loading a first substrate having liquid crystal and fixing seals thereon, and a second substrate having main seals formed thereon into a bonding chamber, bonding the first and second substrates, setting the fixing seals to fix the first and second substrates, and unloading the fixed first and second substrates.

In still further aspect of the present invention, there is provided a method for fabricating an LCD including loading a first substrate having liquid crystal, main seals and fixing seals thereon, and a second substrate into a bonding chamber, bonding the first and second substrates, setting the fixing seals to fix the first and second substrates, and unloading the fixed first and second substrates.

It is to be understood that both the foregoing general description and the following detailed description are exemplary and explanatory and are intended to provide further explanation of the invention as claimed.

BRIEF DESCRIPTION OF THE DRAWING

The accompanying drawings, which are included to provide a further understanding of the invention and are incorporated in and constitute a part of this specification, illustrate embodiments of the invention and together with the description serve to explain principles of the invention.

In the drawings.

DETAILED DESCRIPTION OF THE ILLUSTRATED EMBODIMENTS

Reference will now be made in detail to an embodiment of the present invention, examples of which are illustrated in the accompanying drawings.

FIGS. 2A–2H illustrate steps of fabricating an LCD in accordance with a preferred embodiment of the present invention.

Figure 1A:
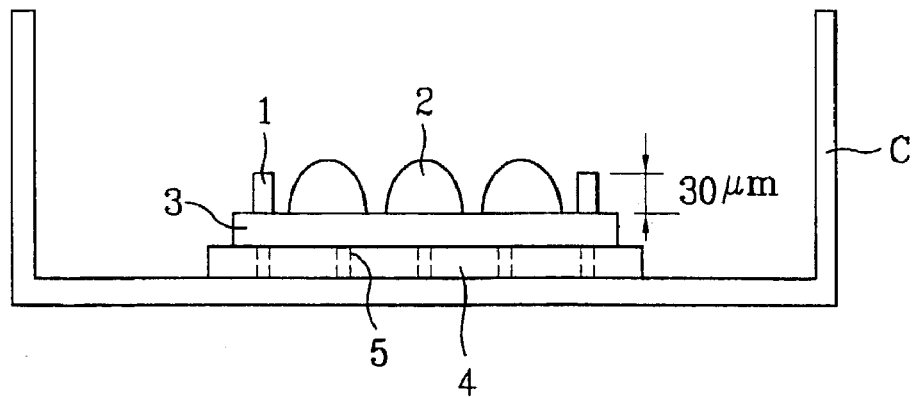
FIGS. 1A–1F illustrate a related art method of fabricating an LCD having a liquid crystal dropping method applied thereto, schematically.
Figure 1B:
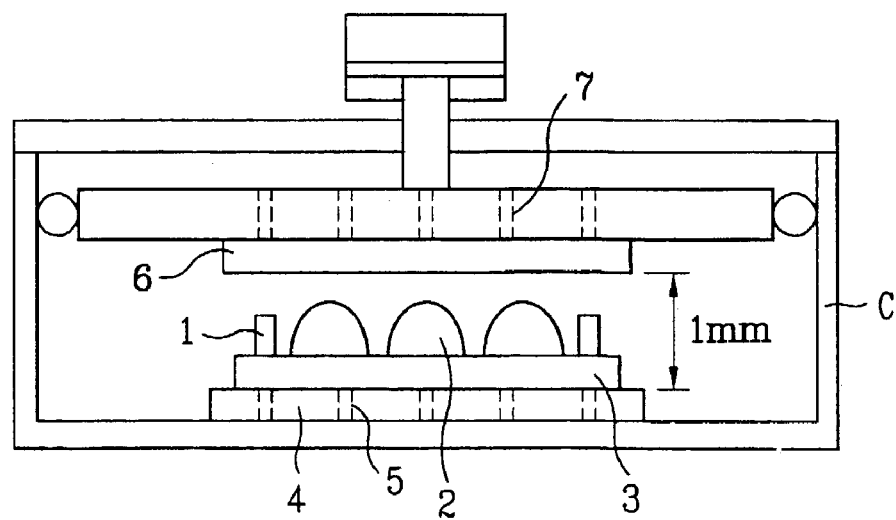
Figure 1C:
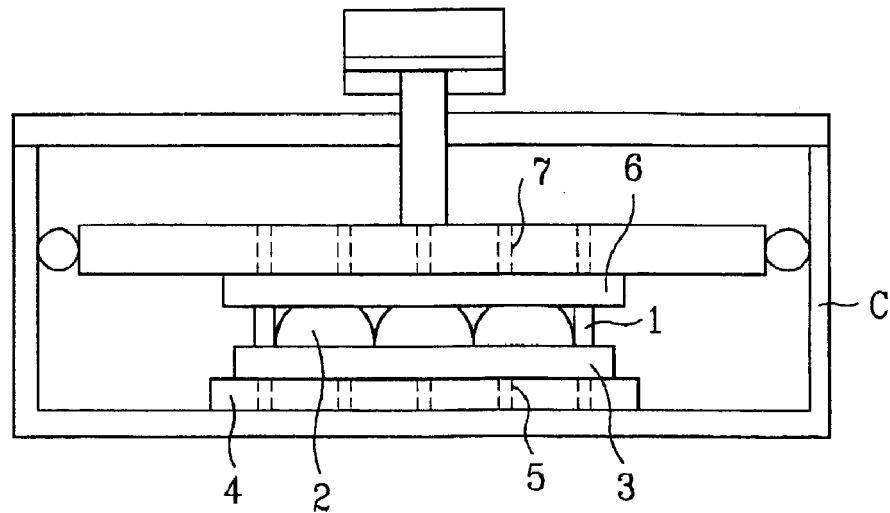
Figure 1D:
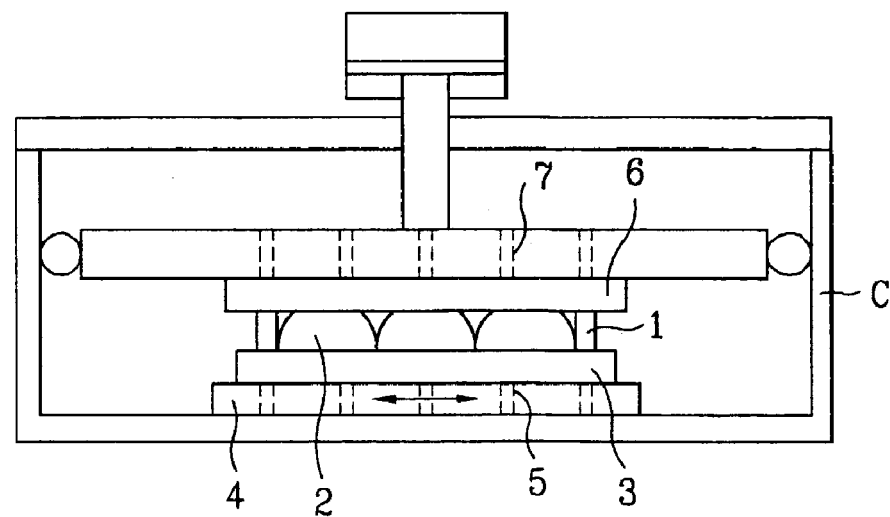
Figure 1E:
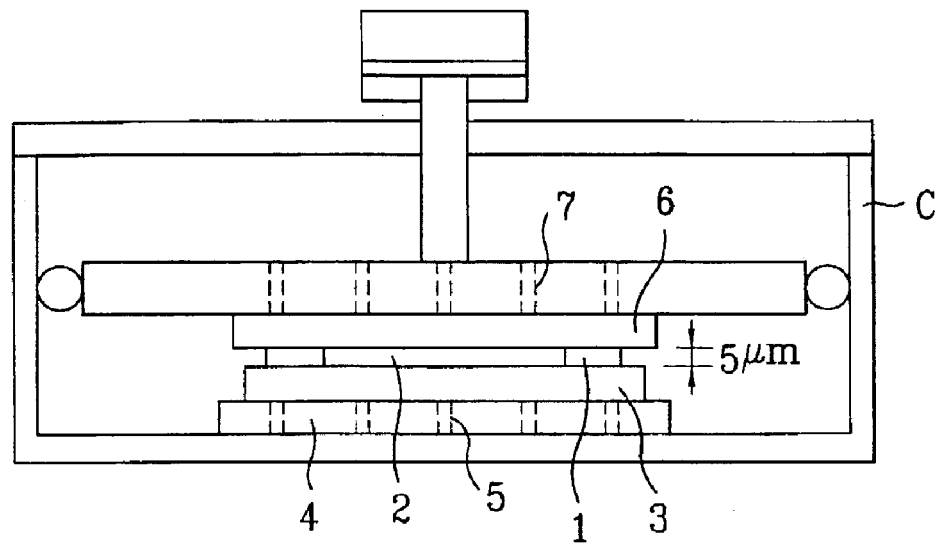
Figure 1F:
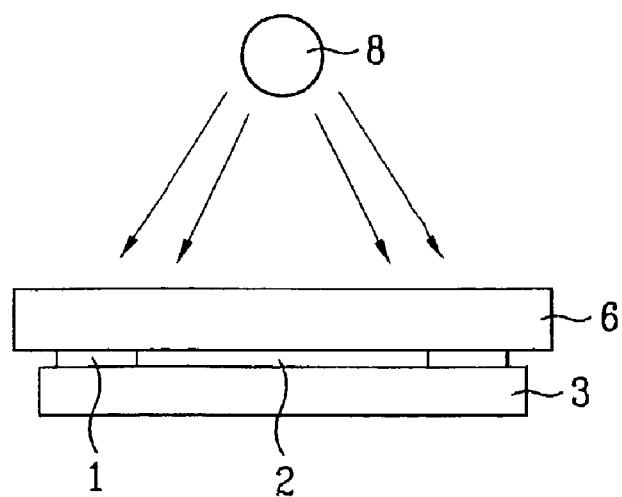
Figure 2A:
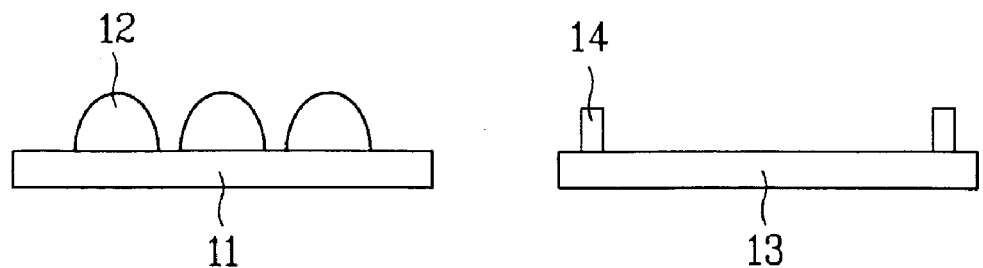
FIGS. 2A–2H illustrate a method of fabricating an LCD in accordance with a preferred embodiment of the present invention.

Referring to FIG. 2A, liquid crystal material 12 may be applied on a first glass substrate 11, and sealant 14 may be coated on a second glass substrate 13. A plurality of first panels arranged within one of the first and second glass substrates 11 and 13 (e.g., the first glass substrate 11), respectively, may each support a thin film transistor array. A plurality of second panels arranged within the other of the first and second glass substrates 11 and 13 (e.g., the second glass substrate 13), respectively, and in correspondence with the plurality of first panels, may each support a color filter array having a black matrix layer, a color filter layer, a common electrode, etc.

In one aspect of the present invention, the sealant 14 may be coated on the first glass substrate 11 and the liquid crystal material 12 may be applied on the second substrate 13. In another aspect of the present invention, both the liquid crystal material 12 and the sealant 14 may be arranged on either of the first and second glass substrates 11 and 13, respectively. According to the principles of the present invention, the substrate supporting the applied liquid crystal material 12 may be held to a lower stage 16 arranged within a vacuum bonding chamber 10 while the substrate not supporting the applied liquid crystal material 12 may be held to an upper stage 15 also arranged within a vacuum bonding chamber 10, as will be discussed in greater detail below.

Supporting the liquid crystal material and the sealant, the first and second glass substrates 11 and 13 may be loaded into a vacuum bonding chamber 10 and bonded together in a bonding process.

Figure 3:
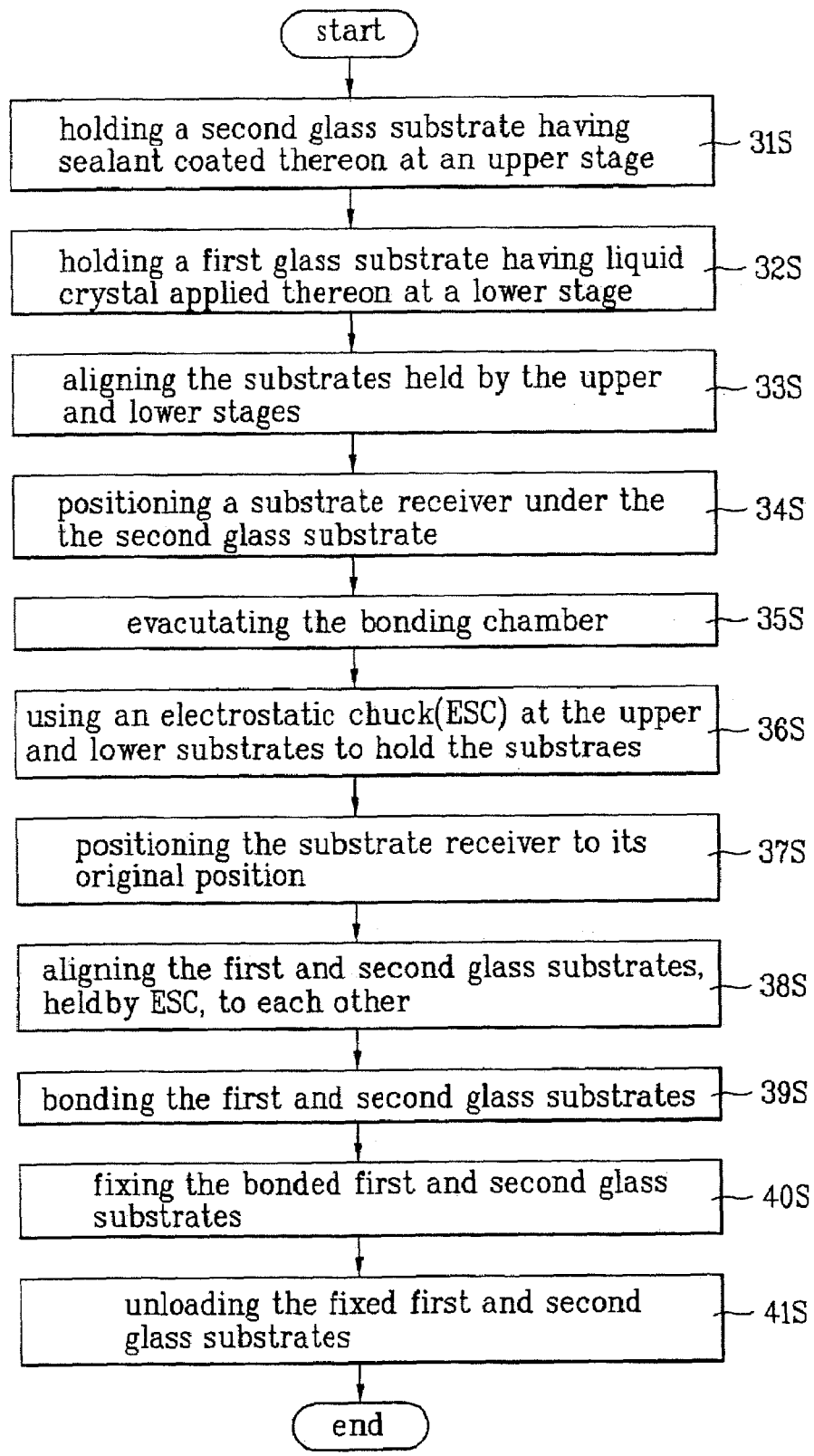
FIG. 3 illustrates a flowchart showing the bonding steps of the present invention.

Referring to FIG. 3, the bonding process may, for example, generally include steps of holding the first and second substrates 11 and 13 to their respective stages, aligning the two substrates, bonding the two substrates together, fixing the bonded substrates, and unloading the fixed substrates from the vacuum bonding chamber.

Figure 2B:
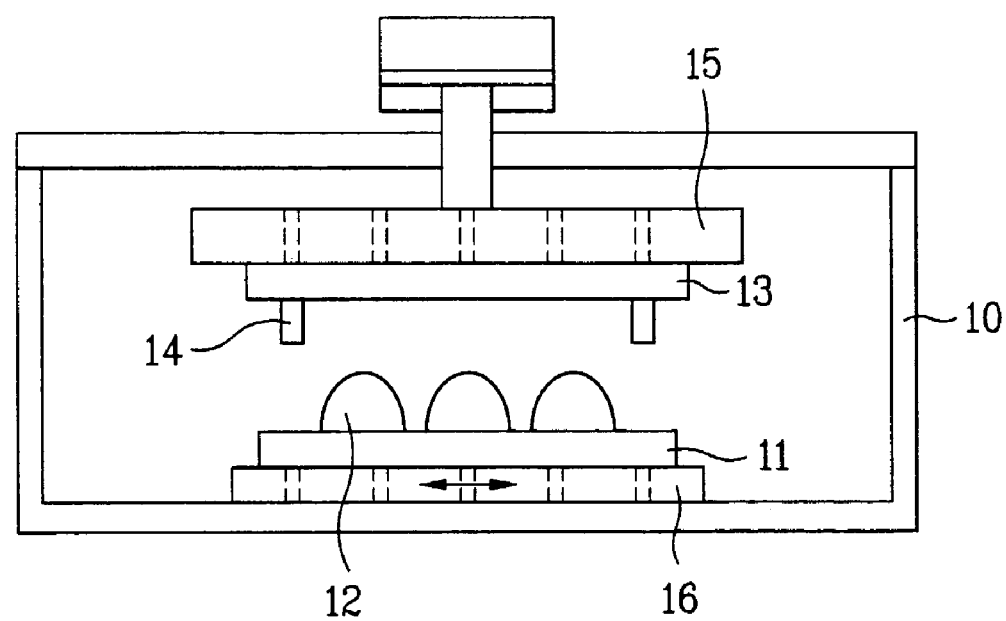

Referring to FIG. 2B, during the loading step, the second glass substrate 13 coated with sealant 14 may be held to an upper stage 15 arranged within the vacuum bonding chamber 10. In one aspect of the present invention, a portion of the second glass substrate 13 on which sealant is coated, may face down (31S). Further, the first glass substrate 11 supporting the applied liquid crystal material 12 may be held to a lower stage 16 arranged within the vacuum bonding chamber 10 (32S). After the first and second substrates 11 and 13 are held to the lower and upper stages 16 and 15, respectively, the vacuum bonding chamber 10 may be provided in a standby state.

In one aspect of the present invention, the second glass substrate 13 coated with the sealant 14 may be secured by a loader of a robot (not shown) such that a portion of the second glass substrate 13 on which the sealant is coated faces down. The loader inserts the second glass substrate 13 into the vacuum bonding chamber 10. To receive the second glass substrate 13, the upper stage 15 arranged within the vacuum bonding chamber 10 may move down from an initial position, hold the second glass substrate 13, and move up toward the initial position. In one aspect of the present invention, the upper stage 15 may hold the second glass substrate 13 using a suction force or an electro static charge (ESC).

After the second substrate 13 is held to the upper stage 15, the loader may be moved out of the vacuum bonding chamber 10. Subsequently, the first glass substrate 11 supporting the applied liquid crystal material 12 may be arranged over the lower stage 16 arranged within the vacuum bonding chamber 10 via the loader.

After the first substrate 11 is held to the lower stage 16, the lower stage 16 is capable of moving along a horizontal direction to align the first and second glass substrates 11 and 13, respectively (33S). A primary alignment process may be performed by aligning a plurality of rough alignment marks, as will be described in greater detail below.

According to the principles of the present invention, as the upper stage 15 holding the second glass substrate 15 moves up, a substrate receiver (not shown) provided within the vacuum bonding chamber 10 may be arranged under the second glass substrate 13 (34S). The substrate receiver may be arranged under the second substrate 13 to prevent the second glass substrate 13 from detaching from the upper stage 15 and falling to the first glass substrate 11 due to a reduction of a suction force within the upper stage 15 holding the second glass substrate 13. In one aspect of the present invention, when a pressure within the vacuum bonding chamber 10 becomes lower than a pressure inducing the suction force the second glass substrate 13 may become detached from the upper stage 15.

In one aspect of the present invention, the second glass substrate 13 and the substrate receiver may be arranged proximate each other by moving the upper stage 15 down or by moving the substrate receiver up. Subsequently, the second glass substrate 13 may be arranged on the substrate receiver.

In another aspect of the present invention, the upper stage 15 may be moved down a predetermined distance before the substrate receiver is moved up predetermined distance such that the second glass substrate 13 is arranged on the substrate receiver.

In yet another aspect of the present invention, the upper stage 15 may be moved down a predetermined distance while the substrate receiver is moved up a predetermined distance such that the second glass substrate 13 is arranged on the substrate receiver.

In one aspect of the present invention, the second glass substrate 13 may be arranged on the substrate receiver before the vacuum bonding chamber is evacuated. Alternatively, the second glass substrate 13 may be arranged on the substrate receiver contemporaneously during evacuation of the bonding chamber. In another aspect of the present invention, fastening means may be provided for fastening the first and second substrates to their respective stages and for preventing the first and second substrates from being shaken when the vacuum bonding chamber is initially evacuated.

After the first and second glass substrates 11 and 13 are held to their respective stages, the vacuum bonding chamber 10 may be evacuated (35S). The degree to which the vacuum bonding chamber 10 is evacuated may depend on the liquid crystal modes of the LCD device being formed. For example, the vacuum bonding chamber 10 may be evacuated to a pressure in a range of about $1.0 \times 10^{-3}$ Pa to 1 Pa for IPS mode LCDs, and about $1.1 \times 10^{-3}$ Pa to $10^2$ Pa for TN mode LCDs.

Evacuation of the vacuum bonding chamber 10 may, for example, be performed in two successive stages for preventing deformation or shaking of the first or second glass substrates. Accordingly, after the first and second glass substrates are held to their respective stages and a door of the vacuum bonding chamber 10 is closed, a first evacuation stage may be performed. After the second substrate 13 is arranged on the substrate receiver, a second evacuation stage may be performed. The rate at which the vacuum bonding chamber 10 is evacuated may be faster in the second evacuation stage than in the first evacuation stage. The first evacuation stage may generate a first reduced pressure within the vacuum bonding chamber 10 that is greater than the pressure inducing the suction force within the upper stage 15.

In an alternative aspect of the present invention, evacuation of the vacuum bonding chamber 10 may be performed in a single evacuation stage. Accordingly, after the first and second glass substrates 11 and 13 are held to their respective stages and the chamber door is closed, the single evacuation stage may be performed while the substrate receiver is arranged at an underside of the upper stage 15. In one aspect of the present invention, the substrate receiver may be arranged at an underside of the upper stage 15 before the pressure within the vacuum bonding chamber 10 becomes lower than a pressure inducing the suction force within the upper stage 15.

Once the vacuum bonding chamber 10 has been evacuated to final reduced pressure, the first and second glass substrates 11 and 13 are held to their respective upper and lower stages via an ESC (36S). Subsequently, the substrate receiver may be moved to its original position (37S).

According to the principles of the present invention, an electro static charge may hold the first and second glass substrates by applying negative or positive DC voltages to two or more plate electrodes formed within each of the upper and lower stages. The applied positive or negative DC voltages induce negative or positive charges, respectively, at the stages that are capable of holding the substrates. For example, a coulomb force may be generated between the stage and a conductive layer supported by the substrate (e.g., transparent electrode, common electrode, pixel electrode, etc.). A stage may be enabled to hold a substrate having a conductive layer facing toward that stage by applying approximately 0.1–1 kV to the plate electrodes within that stage. A stage may be enabled to hold a substrate having a conductive layer facing away from that stage by applying approximately 3–4 kV to the plate electrodes within that stage. An elastic sheet may be provided at the upper stage.

The two substrates may be aligned after the upper stage is moved down a predetermined distance. After the second glass substrate 13 is arranged to within a predetermined distance from the first glass substrate 11, the first glass substrate 11 and the second glass substrate 13 may be aligned to each other (38S).

Figure 4:
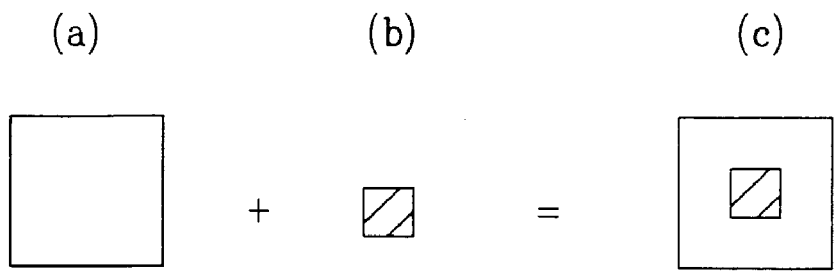
FIG. 4 shows a rough alignment mark for alignment of the first and second substrates in accordance with a preferred embodiment of the present invention.
Figure 5:
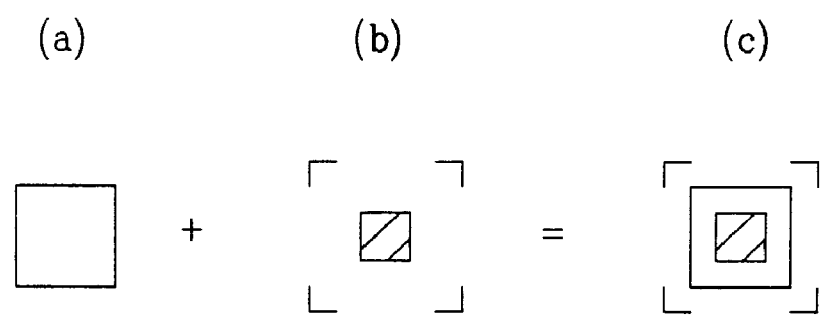
FIG. 5 shows a fine alignment mark for alignment of the first and second substrates in accordance with a preferred embodiment of the present invention.
Figure 6:
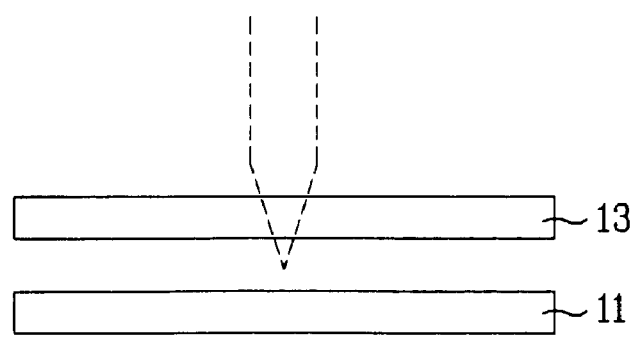
FIG. 6 illustrates a focal point of a camera for alignment in accordance with a preferred embodiment of the present invention.

FIG. 4 illustrates rough alignment marks used in an alignment method in accordance with an embodiment of the present invention, FIG. 5 illustrates fine alignment marks in accordance with another embodiment of the present invention, and FIG. 6 illustrates a camera focusing position in an alignment of the present invention.

Referring to FIGS. 4, and 5, the first and second glass substrates 11 and 13 may include a plurality of rough alignment marks measuring about 3 µm in size (see FIG. 4) and a plurality of fine alignment marks measuring about 0.3 µm in size (see FIG. 5). In one aspect of the present invention, each alignment mark may be provided within each of the first and second glass substrates. The first glass substrate 11 may include at least one rough alignment mark as shown in FIG. 4 and at least the fine alignment mark as shown in FIG. 5. The second glass substrate 13 may include at least one rough alignment mark as shown in FIG. 4 and at least one fine alignment mark as shown in FIG. 5.

In one aspect of the present invention, different cameras may be used to align each of the rough and fine alignment marks. Alternatively, a single camera may be used to align both the rough and fine alignment marks.

Referring to FIG. 6, the cameras used to align the rough and fine alignment marks may be focused on a central region between the first and second glass substrates 11 and 13.

Figure 2C:
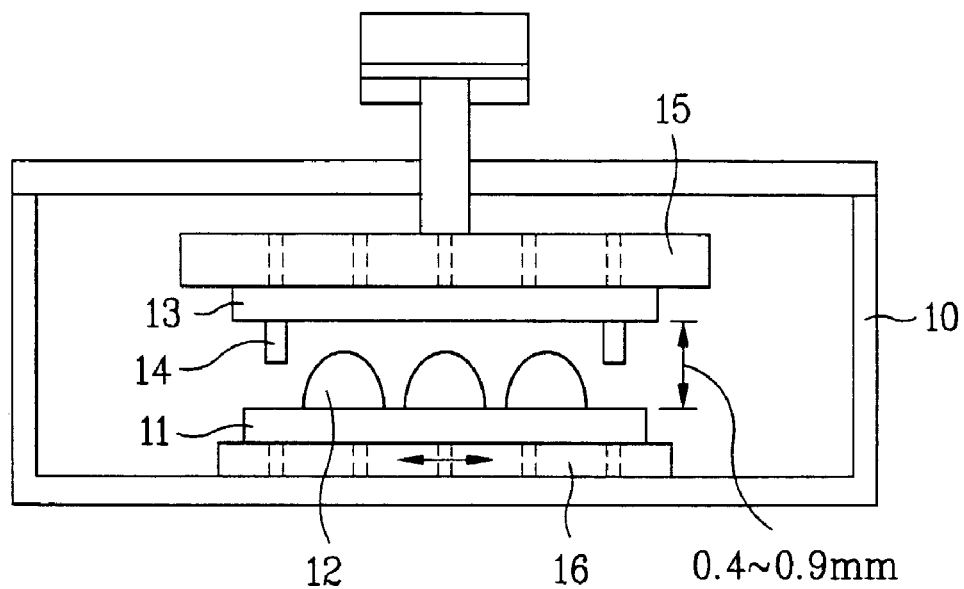
Figure 2D:
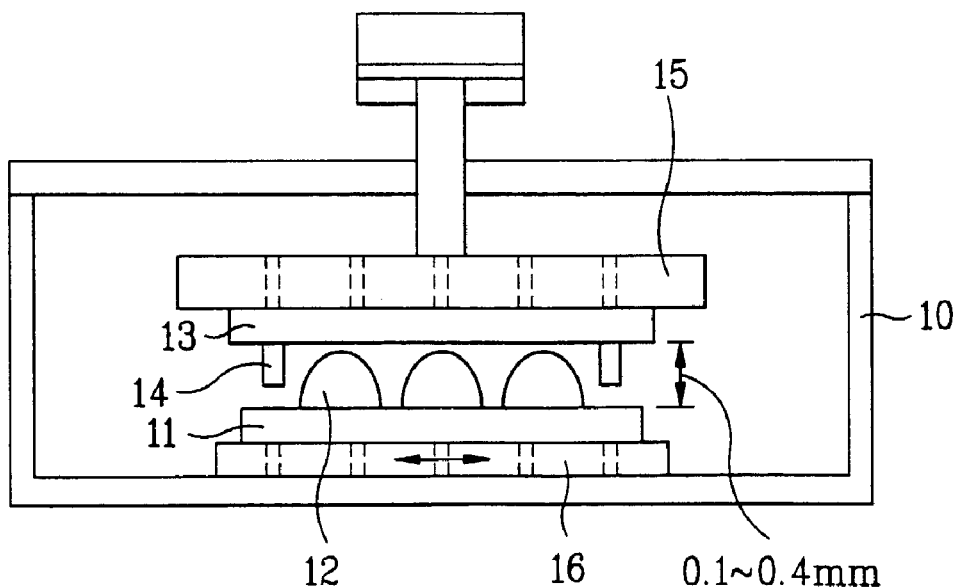

Referring to FIG. 2C, the upper stage 15 may be moved down a first time such that the second glass substrate 13 does not touch the liquid crystal material 12 applied on the first glass substrate 11 and such that a gap between the first and second glass substrates 11 and 13, respectively, is in a range of about 0.4 mm–0.9 mm (e.g., about 0.6 mm). Subsequently, the first glass substrate 11 may be roughly aligned with the second glass substrate 13. For example, the rough alignment mark shown in FIG. 4 may be arranged within the rough alignment mark shown in FIG. 4. In performing the rough alignment, an area of approximately 3.0 mm may be scanned in order to determine the positions of the rough and fine alignment marks Referring now to FIG. 2D, the upper stage may be moved down a second time such that the liquid crystal material 12 applied on the first glass substrate 11 may contact the second glass substrate 13 and such that a gap between the first and second glass substrates 11 and 13, respectively, is in a range of about 0.1 mm–0.4 mm (e.g., about 0.2 mm). Subsequently, the first glass substrate 11 may be finely aligned with the second glass substrate 13. For example, the fine alignment mark shown in FIG. 5B may be arranged within the fine alignment mark shown in FIG. 5A. In performing the fine alignment, an area of approximately 0.2 mm may be scanned in order to determine the positions of the rough and fine alignment marks.

Since the upper stage 15 is movable in vertical (e.g., up and down) directions and the lower stage is movable in horizontal (e.g., X and Y) directions, the lower stage 16 may be moved horizontally to align the two substrates.

During alignment of the rough alignment marks, the cameras may be provided above or below the upper or lower surfaces of the first or second glass substrates. In one aspect of the present invention, the cameras used to locate the alignment marks may be positioned outside the vacuum bonding chamber 10. Accordingly, the cameras may be used to view rough and fine alignment marks on the first and second glass substrates through one or more windows provided in top and bottom walls of the vacuum bonding chamber 10, as required.

In a first exemplary alignment process, a central region between the alignment marks on the second glass substrate 13 and the alignment marks on the first glass substrate 11 may be focused on using cameras arranged over and/or under the first and/or second glass substrates. In a second exemplary alignment process, focal points of the cameras may be adjusted to individually focus on alignment marks formed on the first and second glass substrates 11 and 13, thereby improving alignment accuracy over that of the first exemplary alignment process.

At least four rough and fine alignment marks may be formed on the first and second glass substrates, wherein alignment marks on one substrate correspond in location to alignment marks formed on the other substrate. To improve alignment accuracy, the number of alignment marks may be increased as the size of the glass substrates increases. The rough and fine alignment marks may be formed in regions between panels which are to be cut, or periphery region of the substrate outside of where a plurality of panels are formed.

FIGS. 4C and 5C illustrate the alignment of rough and fine alignment marks when the first and second glass substrates 11 and 13 are aligned. Using different cameras to align the rough and fine alignment marks may increase the speed and accuracy with which the two substrates are aligned.

Figure 2E:
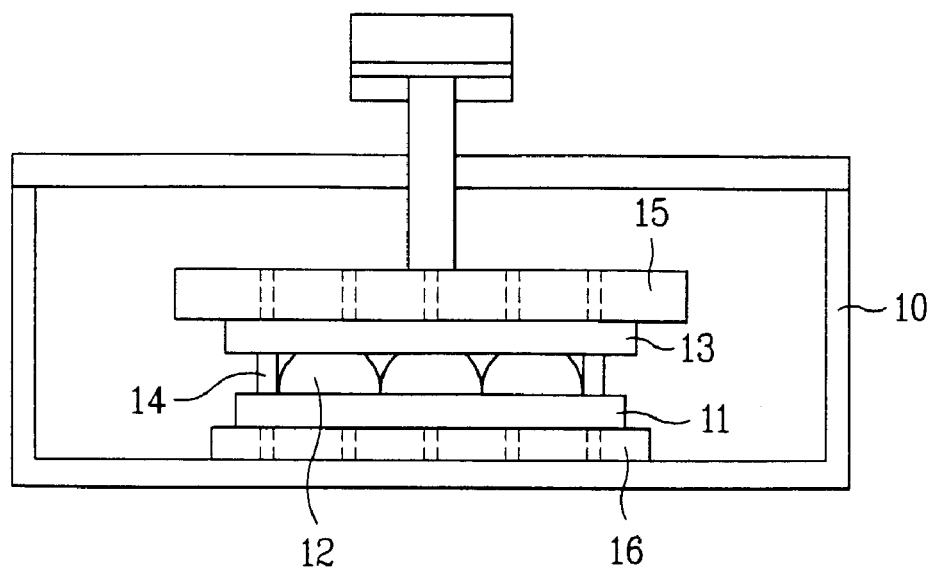
Figure 2F:
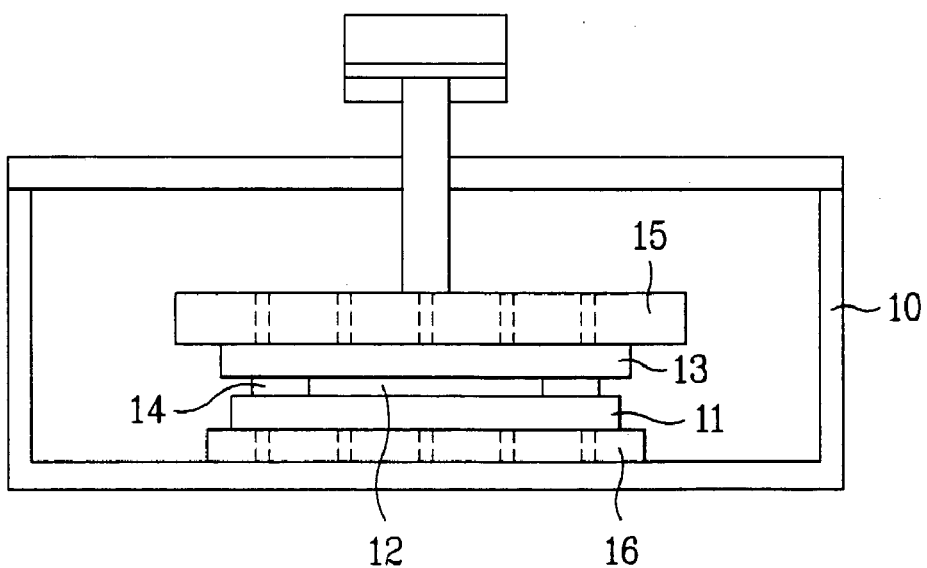

Referring to FIGS. 2E and 2F, after the first and second glass substrates 11 and 13, held by their respective stages 16 and 15, respectively, by ESC are aligned the stages are moved into proximity such that the two glass substrates may by bonded together. The first and second glass substrates 11 and 13 may be pressed together by moving either the upper stage 15 or the lower stage 16 in a vertical direction, while varying speeds and pressures at different stage locations. Until the time the liquid crystal material 12 and the second glass substrate 13 contact each other, or until the time the first glass substrate 11 and the sealant 14 contact each other, the stages may be moved at a fixed speed or fixed pressure. In one aspect of the present invention, the pressure may be incrementally increased from an initial pressure at the time of initial contact to a final pressure. Accordingly, the time of contact may be sensed by a load cell fitted to a shaft of the movable stage (e.g., the upper or lower stage). The two glass substrates 11 and 13 may, for example, be pressed at an initial pressure of 0.1 ton at the time of initial contact, a pressure of 0.3 ton at an intermediate contact stage location, a pressure of 0.4 ton at an full contact stage location, and a final pressure of 0.5 ton at a final stage location (see FIG. 2F).

Though it has been illustrated that the upper stage 15 presses down onto the substrate by means of one shaft, a plurality of shafts may independently apply and control pressure using individual load cells. If the lower stage 16 and the upper stage 15 are not level or fail to be uniformly pressed to the substrates, predetermined ones of the plurality of shafts may be pressed using lower or higher pressures to provide uniform bonding of the sealant 14.

Figure 2G:
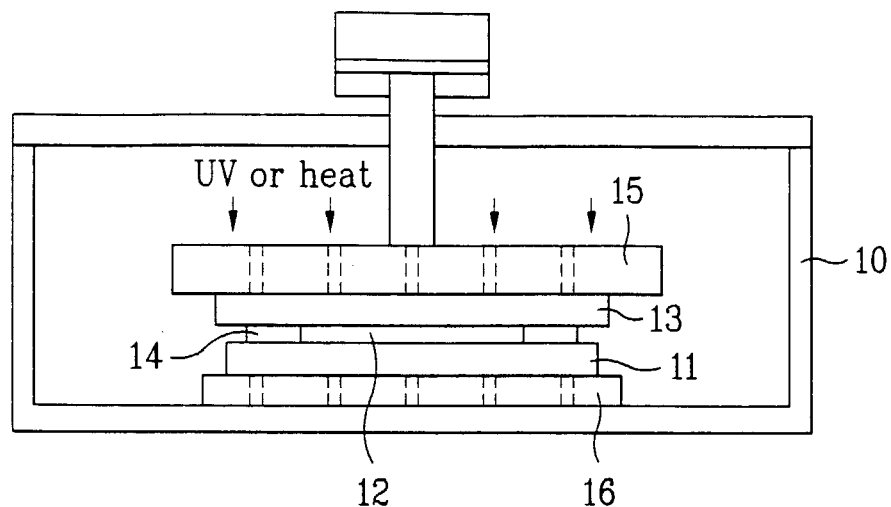

After the first and second glass substrates are bonded to each other, the bonded substrates may be fixed to each other (40S). Referring to FIG. 2G, UV rays may be directed, and/or heat may be applied to the sealant in order to cure (or harden) and fix the first and second glass substrates 11 and 13 together. Because the substrates may be large (e.g., 1.0 m×1.2 m) and the two substrates are bonded to each other after the liquid crystal is applied, misalignment of the two substrates may occur during subsequent processes or transfers after the bonding step. Therefore, a fixing process prevents misalignment of the two substrates and maintains the bonded state of the two glass substrates during subsequent processes or transfers after the process of bonding.

The two glass substrates may be fixed to each other within the vacuum bonding chamber under atmospheric or a reduced pressure. In one aspect of the present invention, the fixing may be performed out after the substrates are bonded together. In another aspect of the present invention, the fixing may be performed prior to completion of the bonding. In yet another aspect of the present invention, a fixing seal and a main seal may be formed from the same material. Alternatively, the fixing seal and the main seal may be formed from different materials to maximize a fixing efficiency of the sealant 14.

The fixing seal may, for example, be formed of a photosetting resin, a thermosetting resin, a UV-thermosetting resin, a pressure setting resin, or a material having high adhesive characteristics. Fixing conditions used with the photosetting resin may, for example, include exposure to light (e.g., UV) having a power of about 50–500 mW (e.g., about 200 mW) for about 5–40 seconds (e.g., about 14 seconds). Fixing conditions used with the thermosetting resin may, for example, include exposure to a temperature in a range of about 50–200° C. for more than about 10 seconds. Accordingly, the two glass substrate may be fixed using any one of light, heat, pressure, or a combination thereof.

Figure 7:
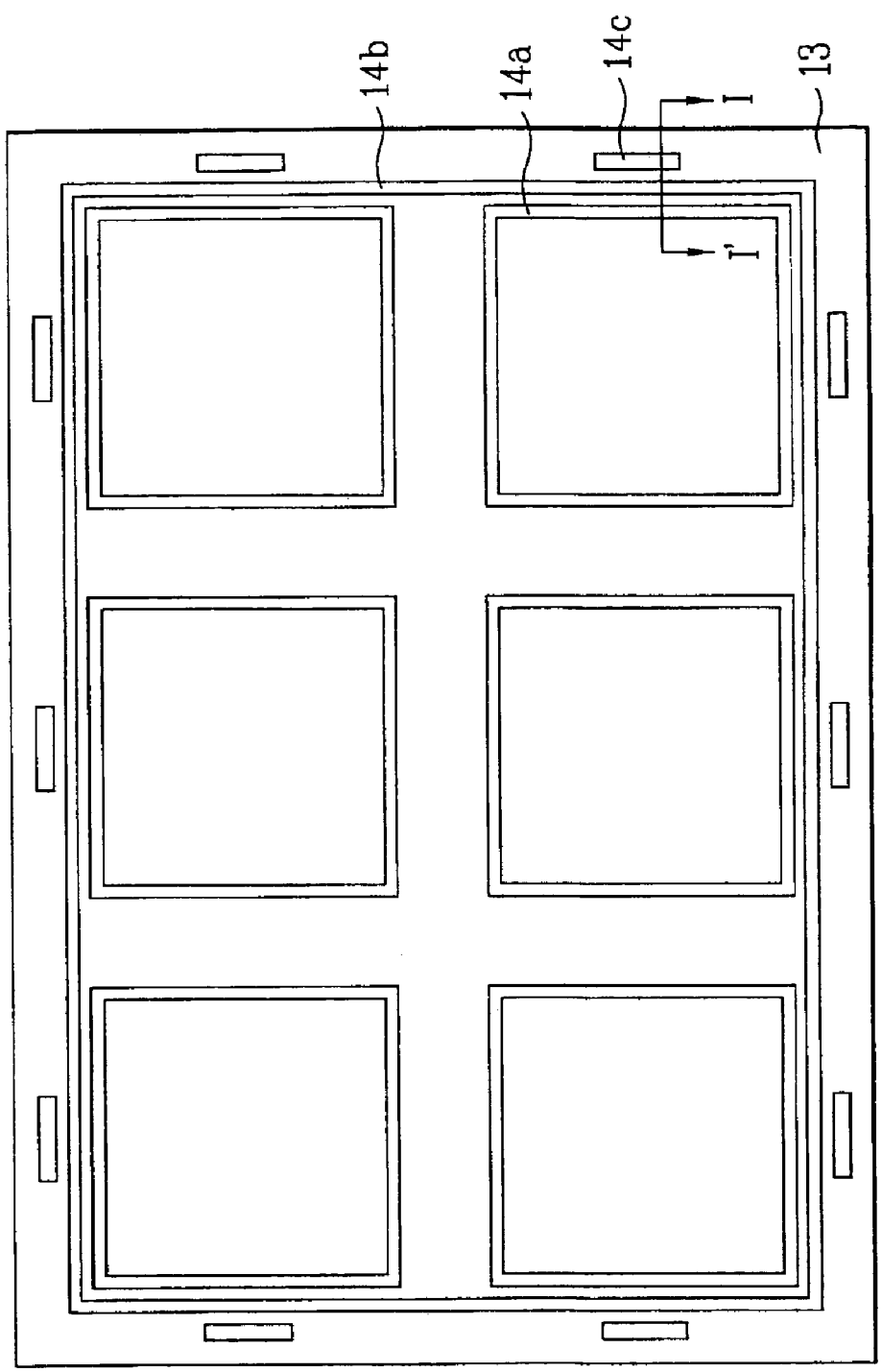
FIG. 7 illustrates a seal pattern for fixing the first and second substrates in accordance with a first preferred embodiment of the present invention.
Figure 13:
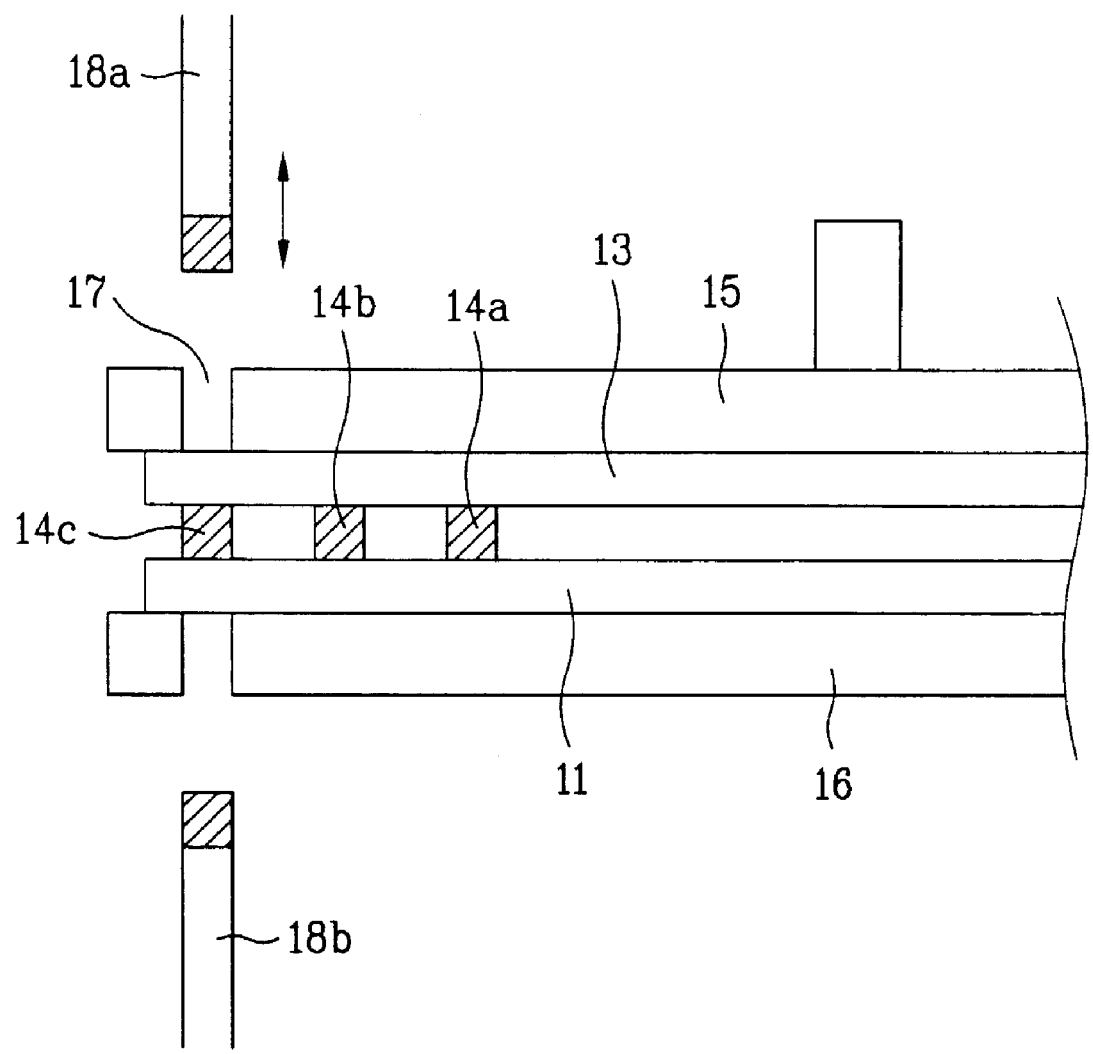
FIG. 13 illustrates a cross-section of a line I–I' in FIG. 7 showing upper and lower stages and substrates.

FIG. 7 illustrates a sealant layout pattern in accordance with a first embodiment of the present invention and FIG. 13 illustrates a section across line I–I' in FIG. 7 showing upper stages, lower stages, and glass substrates.

Referring to FIG. 7, a method for fixing bonded substrates in accordance with a first embodiment of the present invention may, for example, include forming, via any of the aforementioned resins, a plurality of main seals 14a at a periphery of each panel for bonding and sealing liquid crystal material between the two substrates, forming a dummy seal 14b surrounding the panels and for protecting the plurality of main seals 14a arranged within the dummy seal 14b during the bonding process, and forming a plurality of fixing seals 14c at an outside the dummy seal 14b (e.g., at an outer periphery of the substrate) at fixed intervals for initially fixing the first and second glass substrates. In one aspect of the present invention, the plurality of fixing seals 14c may be removed during a cutting process.

In one aspect of the present invention, the main seals 14a, dummy seal 14b, and the fixing seals 14c may all be formed on the second glass substrate. In another aspect of the present invention, the dummy seal 14b and/or the fixing seals 14c may be formed on the first glass substrate 11. In yet another aspect of the present invention, the fixing seals 14c may be formed of a material different from the material from which the main seals 14a are formed.

The first and second glass substrates may be 11 and 13 may be fixed to each other by forming the fixing seals 14c, bonding the two substrates, and directing light and/or applying heat to fix the fixing seals 14c. When the fixing seals 14c are formed from a photosetting resin, light may be selectively directed to the fixing seals 14c to fix the two glass substrates. When the fixing seals 14c are formed of a thermosetting resin, heat may be selectively applied to the fixing seals 14c to fix the two glass substrates.

Referring to FIG. 13, the upper stage 15 and/or the lower stage 16 may include a plurality of holes 17 used to direct light or apply heat. Before the substrates are bonded to each other, the fixing seals 14c and the holes 17 may be aligned. Accordingly, light or heat may be provided to the fixing seals 14c from an upper stage side or a lower stage side through the holes 17 to thereby fix the fixing seals 14c. In one aspect of the present invention, when the fixing seals 14c are formed of a photosetting resin, light may be emitted from a light emitting pin 18a or 18b capable of moving down from an upper side of the vacuum bonding chamber or up from a lower side of the vacuum bonding chamber. In another aspect of the present invention, when the fixing seals 14c are formed of a thermosetting resin, heat may be applied by a heating device 18a or 18b capable of moving down from the upper side of the vacuum bonding chamber or moved up from the lower side of the vacuum bonding chamber within the holes 17. Accordingly, the heating devices may contact a portion of the first or second substrates or the fixing seals 14c to apply heat to the fixing seals 14c. In another aspect of the present invention, light and heat may be simultaneously provided to the fixing seals 14c.

Figure 8:
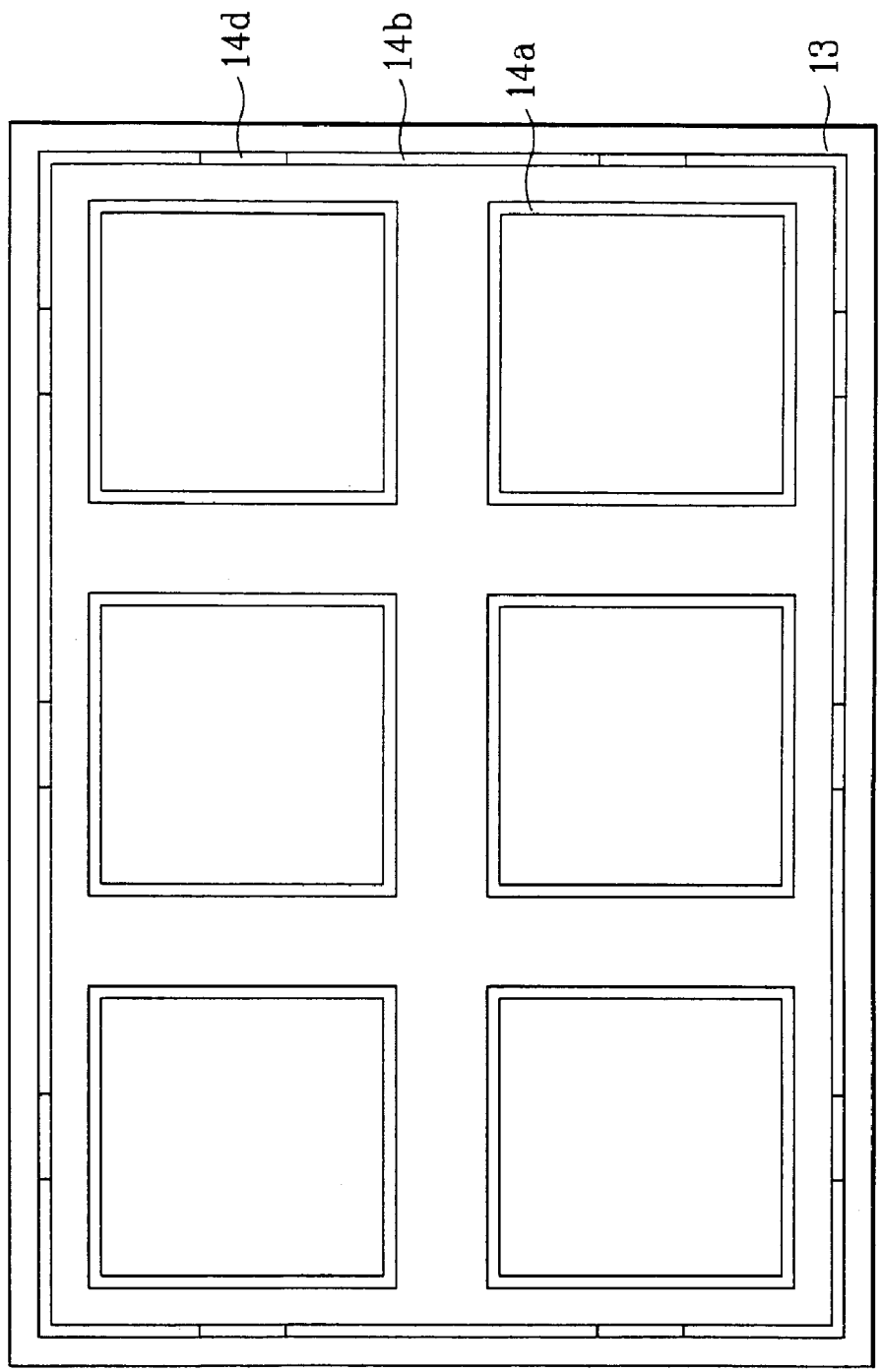
FIG. 8 illustrates a seal pattern for fixing the first and second substrates in accordance with a second preferred embodiment of the present invention.

FIG. 8 illustrates a layout of seals for explaining fixing in accordance with a second embodiment of the present invention.

Referring to FIG. 8, a method for fixing the two glass substrates in accordance with a second embodiment of the present invention may, for example, include coating a resin selected from any of the aforementioned resin materials (e.g., photosetting, thermosetting, UV-thermosetting, pressure setting resin, etc.), forming a plurality of main seals 14a on a periphery of all the panels, forming a dummy seal 14b, and directing light, applying heat, applying pressure, or a combination thereof, to portions of the dummy seal 14b, to fix the two glass substrates.

In accordance with the present embodiment, as shown in FIG. 8, the dummy seal 14b may be provided in the same region where fixing seals are to be formed. Subsequently, light may be directed and/or heat may be applied to fix portions of the dummy seal 14b at locations corresponding to fixing seal locations. The light and/or heat provided to the portions of the dummy seal 14b may be substantially the same as described with respect to the first embodiment. Reference numeral 14d in FIG. 8 denotes portions of the dummy seal 14b where the light and/or the heat is provided. Accordingly, the dummy seal 14b may be used to form fixing seals equivalent to the fixing seals 14c found in the first embodiment.

Figure 9:
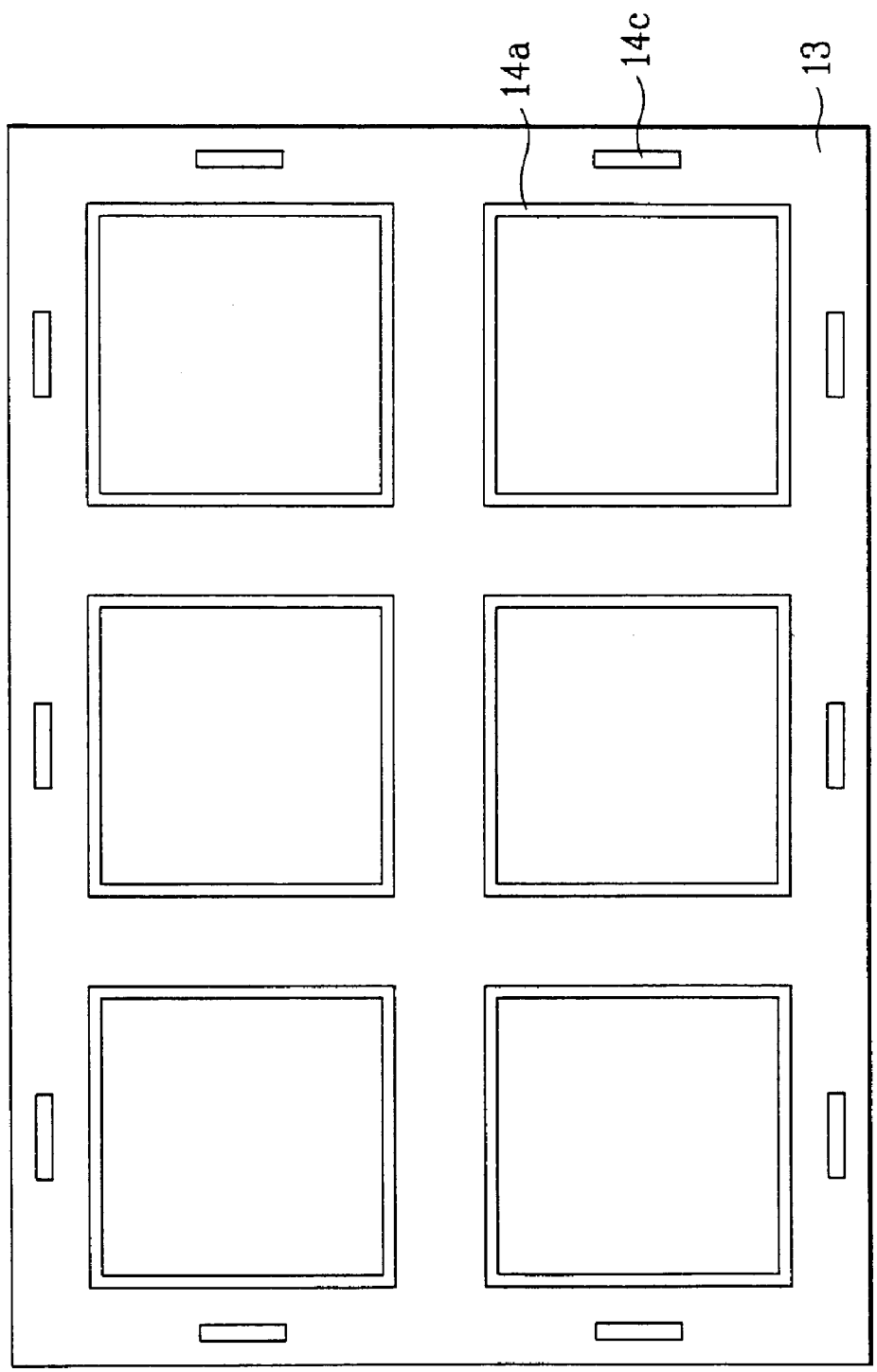
FIG. 9 illustrates a seal pattern for fixing the first and second substrates in accordance with a third preferred embodiment of the present invention.

FIG. 9 illustrates seal layout pattern in accordance with a third embodiment of the present invention.

Referring to FIG. 9, a method for fixing the two glass substrates in accordance with the third embodiment of the present invention includes omitting the formation of the dummy seal. Accordingly, the two substrates may be fixed together by forming the fixing seals 14c in a periphery of the substrate and directing light, applying heat, and/or applying pressure to the fixing seals 14c, as similarly described with reference to the first embodiment of the present invention. Further, the fixing seals 14c may have a closed form, as with the dummy seal in the previously described embodiments.

Figure 10:
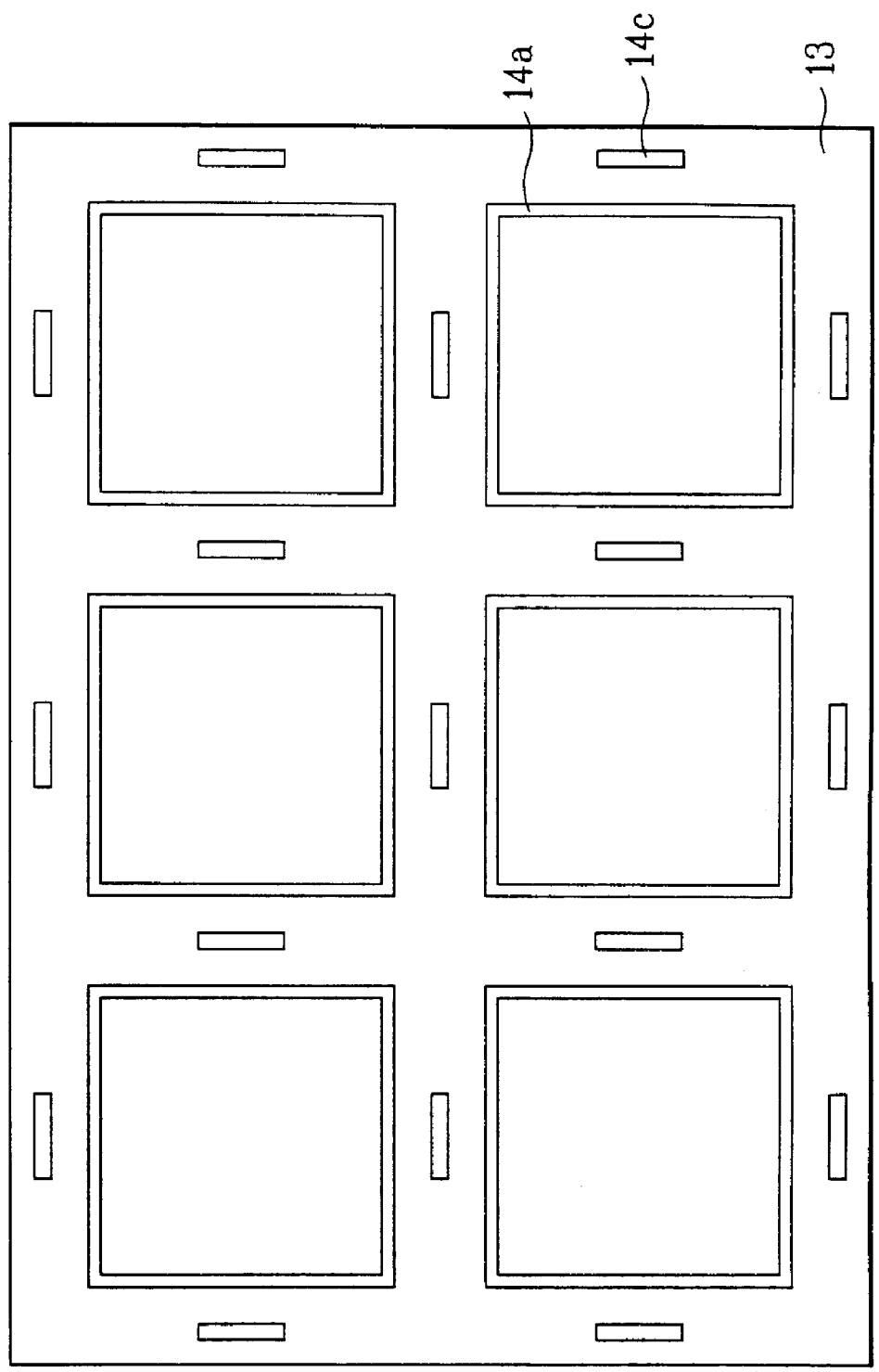
FIG. 10 illustrates a seal pattern for fixing the first and second substrates in accordance with a fourth preferred embodiment of the present invention.

FIG. 10 illustrates a seal layout pattern in accordance with a fourth embodiment of the present invention.

Referring to FIG. 10, a method for fixing the two glass substrates in accordance with a fourth embodiment of the present invention includes forming the fixing seals 14c in a periphery of the substrate and also at fixed intervals within cutting regions between adjacent panels. Light, heat, and/or pressure may be provided to the fixing seals 14c as previously described with reference to the third embodiment of the present invention. Other processing conditions may be substantially the same as those described with reference to the first embodiment.

Figure 11:
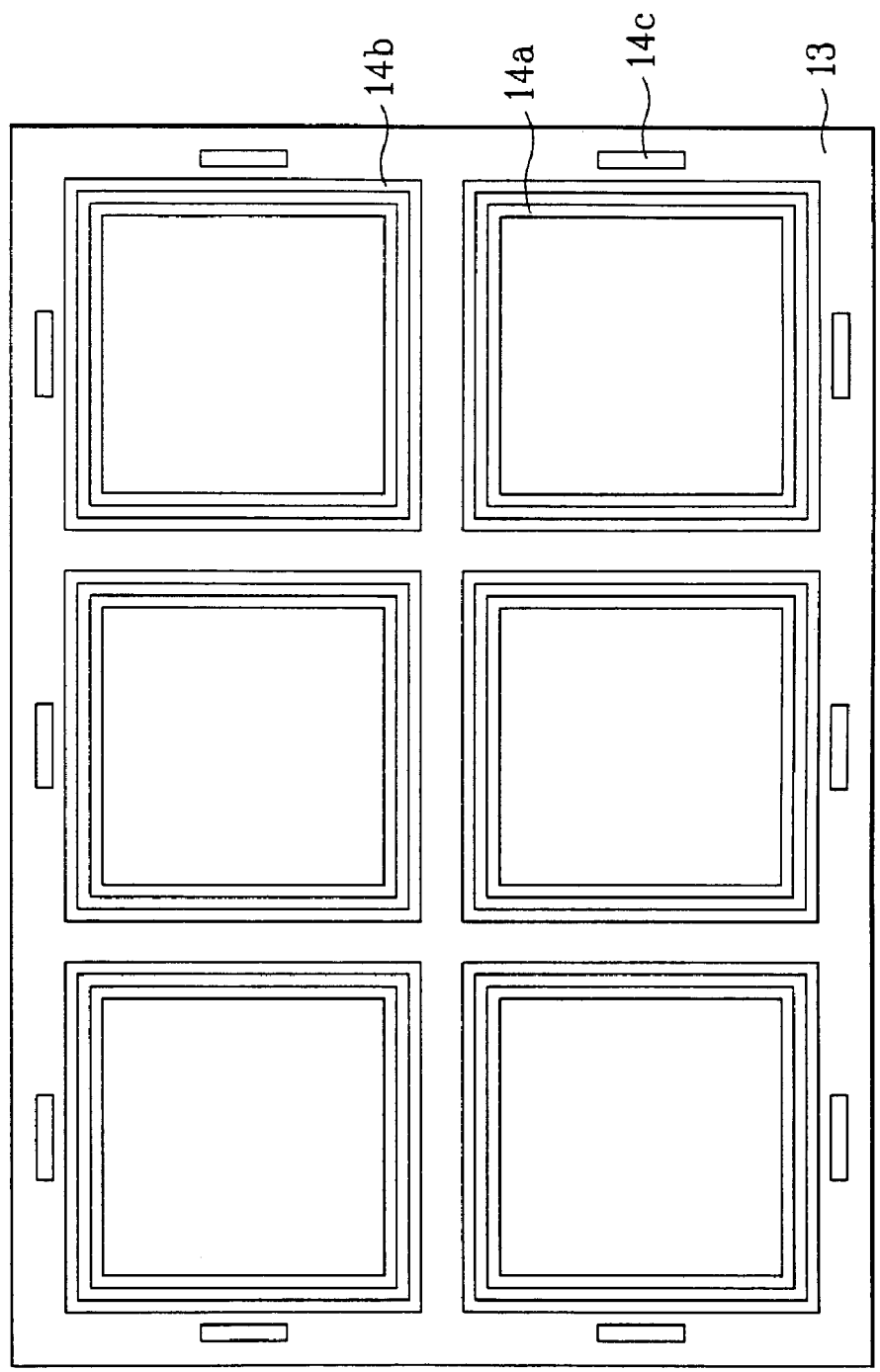
FIG. 11 a illustrate seal pattern for fixing the first and second substrates in accordance with a fifth preferred embodiment of the present invention.

FIG. 11 illustrates a seal layout pattern in accordance with a fifth embodiment of the present invention.

Referring to FIG. 11, a method for fixing the two glass substrates in accordance with a fifth embodiment of the present invention includes forming a plurality of dummy seals 14b that surround each of the panels (main seals), forming the fixing seals 14c in a periphery of the substrate, and providing light, heat, and/or pressure to the fixing seals 14c as previously described with reference to the first embodiment of the present invention. Other processing conditions may be substantially the same as those described with reference to the first embodiment.

Figure 12:
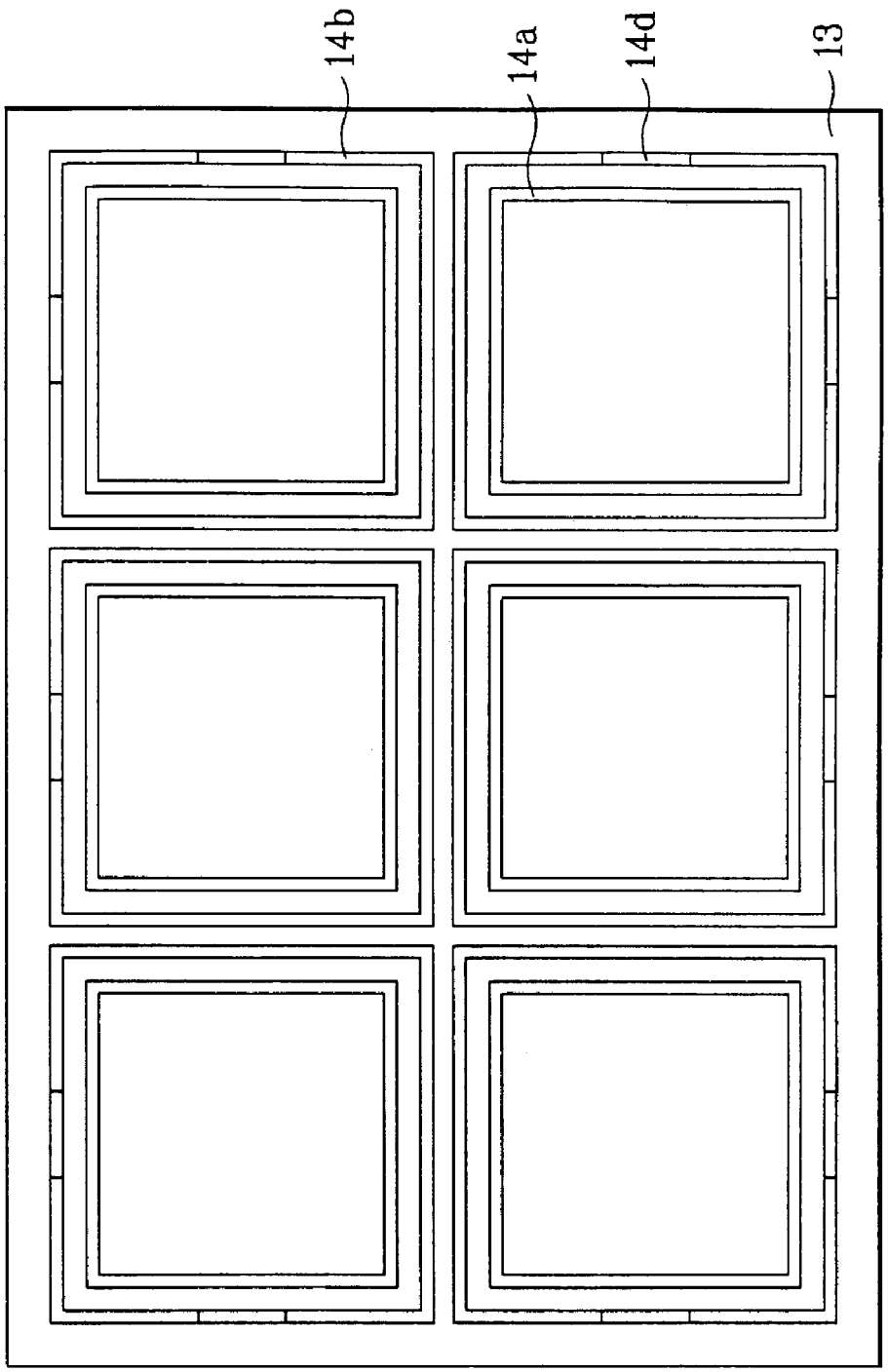
FIG. 12 illustrates a seal pattern for fixing the first and second substrates in accordance with a sixth preferred embodiment of the present invention.

FIG. 12 illustrates a seal layout pattern in accordance with a sixth preferred embodiment of the present invention.

Referring to FIG. 12, a method for fixing the two glass substrates in accordance with a sixth embodiment of the present invention includes selectively providing light and/or heat to portions of a plurality of dummy seals 14b formed around each panel. Light and/or heat may be selectively provided to the dummy seals 14b in accordance with the fifth embodiment of the present invention shown in FIG. 11. Other processing conditions may be substantially the same as those described with reference to the first embodiment.

In one aspect of the present invention, the main seals 14a, the dummy seals 14b, and the fixing seals 14c of any of the aforementioned embodiments may or may not be formed on the same substrate. In another aspect of the present invention, the main seals 14a or the dummy seals 14b of any of the aforementioned embodiments may be formed on the substrate having the liquid crystal material 12 applied thereon.

Though not shown in the FIGS., a method for fixing the bonded substrates in accordance with a seventh embodiment of the present invention may include selectively providing light and/or heat to portions of main seals, wherein the main seals may be formed of a photosetting or thermosetting resin or combinations thereof.

Also, though not shown in the FIGS., a method for fixing the bonded substrates in accordance with an eighth embodiment of the present invention may include applying an adhesive having a fixing characteristic greater than that of the fixing seals 14c of the first, third, fourth, or fifth embodiments. Accordingly, the first and second glass substrates may also be bonded via the adhesive.

In one aspect of the present invention, liquid crystal material may be applied on the first glass substrate 11 and the main seals and fixing seals may also be formed on the first glass substrate 11.

Once the two glass substrates are fixed, misalignment of the bonded first and second glass substrates may be prevented during transfer of the bonded glass substrates required for subsequent fabrication processes.

Figure 2H:
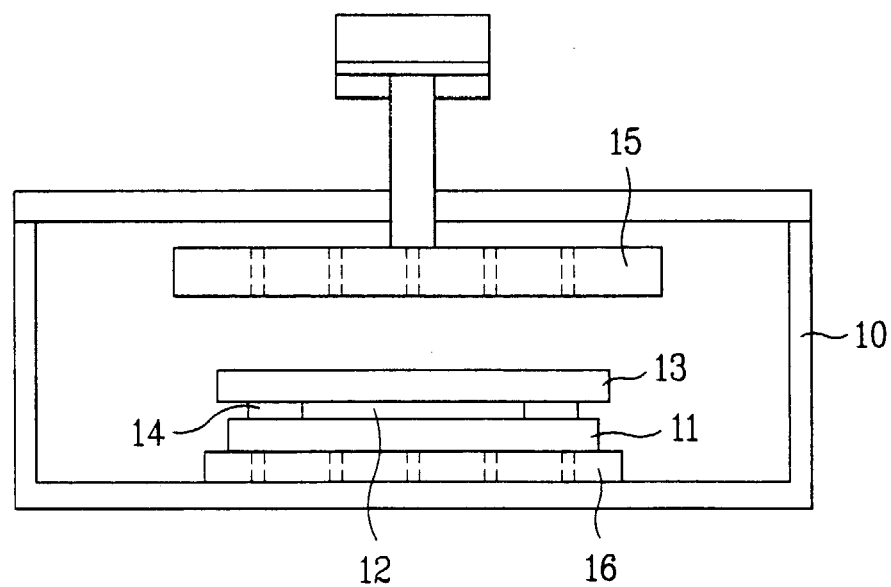

Referring now to FIG. 2H, after the two glass substrates are fixed, the ESC is turned off and the upper stage 15 is moved up. Accordingly, the upper stage 15 may be separated from the fixed first and second glass substrates 11 and 13. Next, the fixed substrates are unloaded (41S) from the vacuum bonding chamber 10. Accordingly, after the two bonded substrates are fixed, the upper stage 15 may be moved up and the fixed first and second glass substrates 11 and 13 may be unloaded via the loader of the robot. Alternatively, the fixed first and second glass substrates 11 and 13 may be held to the upper stage 15 as its moves up and the loader of the robot may unload the first and second glass substrates 11 and 13 from the upper stage 15.

According to the principles of the present invention, an amount of time required to fabricate the LCD may be reduced by inserting one of an unbonded first and second glass substrate 11 and 13 into the vacuum bonding chamber 10 while the fixed first and second glass substrates remain within the vacuum bonding chamber 10. For example, after an unbonded second glass substrate 13 is inserted in the vacuum bonding chamber 10 via the loader of the robot and held to the upper stage 15 (e.g., via a suction force), the fixed first and second glass substrates arranged on the lower stage 16 may be removed from the vacuum bonding chamber 10. Alternatively, after the upper stage 15 holding the fixed first and second glass substrates 11 and 13 is moved up, the loader of the robot may arrange an unbonded first glass substrate 11 onto the lower stage 16 while the fixed first and second glass substrates may be unloaded.

In one aspect of the present invention, a liquid crystal spreading process may be performed prior to unloading the fixed substrates from the vacuum bonding chamber 10. Accordingly, the liquid crystal material 12 may be may be uniformly spread toward the sealant 14. Alternatively, a liquid crystal spreading process may be performed to uniformly spread the liquid crystal material 12 toward the sealant 14 in the event the liquid crystal material 12 does not adequately spread after the unloading. The liquid crystal spreading process may be performed for more than about 10 min. under the atmospheric pressure or a under a reduced pressure.

Fabricating LCD devices according to the principles of the present invention is advantageous for the following reasons.

First, applying the liquid crystal material on the first glass substrate and the coating the sealant on the second glass substrate shorten a fabrication time prior to bonding the two glass substrates.

Second, applying the liquid crystal material on the first glass substrate and coating the sealant on the second glass substrate permits a balanced progression of the fabrication processes of the first and second glass substrates, thereby allowing efficient use of a production line.

Third, applying the liquid crystal material on the first glass substrate and coating the sealant on the second glass substrate minimizes contamination of the seal from particles because the substrate having the seal coated thereon may be cleaned just prior to bonding.

Fourth, positioning the substrate receiver under the substrate and evacuating the vacuum bonding chamber permits to prevent the substrate held to the upper stage from falling down and being broken.

Fifth, the two staged evacuation of the vacuum bonding chamber prevents deformation of the glass substrates and turbulent air flow within the chamber caused by a vacuum.

Sixth, the adjustment of a gap between the first and second glass substrates and the employment of separate cameras in aligning the rough and fine alignment marks facilitates fast and accurate alignment of the first and second substrates.

Seventh, sensing the time during which the two glass substrates come into contact and the varying of the pressure used in bonding the two substrates minimizes damage made by the liquid crystal to the orientation film.

Eighth, since the upper stage presses substrate down via a plurality of shafts, each capable of applying pressure independently, the sealant can may be uniformly bonded by applying relatively lower or higher pressures at predetermined ones of shafts.

Ninth, misalignment of the first and second glass substrates may be prevented upon performing subsequent processes or transferring the fixed substrates.

Tenth, simultaneous loading and unloading of glass substrates shortens fabrication times.

Eleventh, the liquid crystal spreading process shortens a fabrication time period of the LCD.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A method for fabricating a liquid crystal display (LCD), comprising:
    loading first and second substrates into a bonding chamber, the second substrate having a sealant formed thereon;
    aligning the first and second substrates by using alignment marks on the first and second substrates, wherein the aligning includes performing a first alignment using a first portion of the alignment marks and performing a second alignment using a second portion of the alignment marks, and wherein the first and second alignments are performed by moving at least one of the first and second substrates;
    bonding the first and second substrates to form a bonded substrate structure;
    fixing together the first substrate and the second substrate of the bonded substrate structure to form a fixed bonded substrate structure; and
    unloading the fixed bonded substrate structure of the first and second substrates.

2. The method as claimed in claim 1, wherein the first and second substrates are farther apart from each other during the first alignment than during the second alignment.

3. The method as claimed in claim 1, further comprising moving the second substrate before aligning the first and second substrates.

4. The method as claimed in claim 1, wherein loading the first and second substrates includes loading the first and second substrates on lower and upper stages of the bonding chamber, the method further comprising:
    placing a substrate receiver in the bonding chamber below the second substrate held by the upper stage,
    evacuating the bonding chamber, and holding the first and second substrates using electrostatic charge chuck (ESC), respectively.

5. The method as claimed in claim 4, wherein aligning the first and second substrates includes:
   aligning rough marks on the first and second substrates; and
   aligning fine marks on the first and second substrates in succession by moving at least one of the upper and lower stages.

6. The method as claimed in claim 5, wherein aligning the rough marks and the fine marks have dedicated separate cameras.

7. The method as claimed in claim 6, wherein aligning of the rough marks and the fine marks are made by focusing at least one of the cameras to a central position between the first and second substrates.

8. The method as claimed in claim 6, wherein aligning of the rough marks and the fine marks are made by focusing at least one of the cameras to the marks on the first substrate and on the second substrate, alternately.

9. The method as claimed in claim 1, wherein bonding the first and second substrates includes varying pressure applied on the first and second substrates.

10. The method as claimed in claim 1, wherein the sealant includes a main sealant and a second sealant; and fixing the bonded substrate structure includes one of exposing light, applying heat and applying pressure to the fixing sealant.

11. The method as claimed in claim 10, wherein the second sealant includes a fixing sealant formed on a periphery of the second substrate.

12. The method as claimed in claim 10, wherein second sealant includes a fixing sealant is formed on a plurality of parts of the second substrate, the fixing sealant being subsequently cut.

13. The method as claimed in claim 10, wherein applying heat to fix the bonded substrate structure includes heating at a range of about 50–200° C.

14. The method as claimed in claim 10, wherein exposing light includes exposing light at about 50–500 mW.

15. The method as claimed in claim 1, wherein the sealant includes a main sealant for sealing the first and second substrates, a dummy sealant for protecting the main sealant, and a fixing sealant for fixing the bonded two substrates; and fixing the bonded substrate structure includes one of exposing light, applying heat and applying pressure to the fixing sealant for fixing the bonded substrate structure.

16. The method as claimed in claim 15, wherein the dummy sealant protects the main sealant, and exposing light including ultraviolet (UV).

17. The method of claim 1, wherein the first substrate includes glass with at least one side having a dimension of at least 1.0 meter.

18. The method of claim 17, wherein the glass has a second side having a dimension of at least 1.0 meter.

19. The method of claim 1, wherein the first and second substrates each include glass having an area of about 1.0 square meter.

20. The method of claim 1, wherein the first and second substrates each include glass having an area of at least 1.0 square meter.

21. A method of manufacturing a liquid crystal display (LCD) device, comprising:
   preparing a first substrate and a second substrate;
   loading the first and second substrates into a bonding chamber, the second substrate having a sealant formed thereon;
   aligning the first and second substrates by using alignment marks on the first and second substrates, wherein the aligning includes performing a first alignment using a first portion of the alignment marks and performing a second alignment using a second portion of the alignment marks, and wherein the first and second alignments are performed by moving at least one of the first and second substrates;
   applying liquid crystal on one of the first and second substrates;
   bonding the first and second substrates to form a bonded substrate structure;
   fixing together the first substrate and the second substrate of the bonded substrate structure to form a fixed bonded substrate structure; and
   unloading the fixed bonded substrate structure of the first and second substrates.

* * * * *